(12) United States Patent
Diab et al.

(10) Patent No.: US 9,374,614 B2
(45) Date of Patent: Jun. 21, 2016

(54) METHOD AND SYSTEM FOR ENABLING VIDEO COMMUNICATION VIA ETHERNET UTILIZING ASYMMETRICAL PHYSICAL LAYER OPERATIONS

(71) Applicant: Broadcom Corporation, Irvine, CA (US)

(72) Inventors: Wael Diab, San Francisco, CA (US); Yong Kim, San Jose, CA (US); Scott Powell, Carlsbad, CA (US)

(73) Assignee: BROADCOM CORPORATION, Irvine, CA (US)

( * ) Notice: Subject to any disclaimer, the term of this patent is extended or adjusted under 35 U.S.C. 154(b) by 123 days.

(21) Appl. No.: 14/462,270

(22) Filed: Aug. 18, 2014

(65) Prior Publication Data

US 2014/0359676 A1    Dec. 4, 2014

Related U.S. Application Data

(63) Continuation of application No. 11/848,507, filed on Aug. 31, 2007, now abandoned.

(60) Provisional application No. 60/917,870, filed on May 14, 2007.

(51) Int. Cl.
*H04N 7/18* (2006.01)
*H04N 7/173* (2011.01)
(Continued)

(52) U.S. Cl.
CPC ......... *H04N 21/43632* (2013.01); *G09G 5/006* (2013.01); *H04L 12/2805* (2013.01); *H04L 12/2816* (2013.01); *H04N 5/85* (2013.01); *H04N 7/106* (2013.01); *H04N 9/8042* (2013.01); *H04N 19/172* (2014.11); *H04N 19/176* (2014.11); *H04N 19/61* (2014.11); *H04N 21/43615* (2013.01); *H04N 21/6373* (2013.01); *H04N 21/64322* (2013.01); *G09G 2370/10* (2013.01); *H04L 2012/2849* (2013.01); *Y02B 60/44* (2013.01)

(58) Field of Classification Search
CPC ................... H04N 21/43615; H04N 21/6373
USPC .................................................. 725/80, 93
See application file for complete search history.

(56) References Cited

U.S. PATENT DOCUMENTS

| | | | |
|---|---|---|---|
| 7,519,081 B2 | 4/2009 | Sorenson et al. | |
| 7,545,794 B2 | 6/2009 | Loukianov | |
| 7,835,374 B2 | 11/2010 | Diab | |
| 8,179,910 B2 | 5/2012 | Diab | |

(Continued)

*Primary Examiner* — Pankaj Kumar
*Assistant Examiner* — Franklin Andramuno
(74) *Attorney, Agent, or Firm* — Oblon, McClelland, Maier & Neustadt, L.L.P

(57) ABSTRACT

Signals may be communicated between a video source and a video rendering device via and asymmetrical multi-rate Ethernet physical layer (PHY). The asymmetric multi-rate PHY may support multiple rates. The asymmetrical multi-rate Ethernet PHY may handle compressed and/or uncompressed, encrypted and/or unencrypted video signals and may handle audio/video bridging. One or more of the communicated signals may be modified by an echo cancellation operation, a near end cross talk (NEXT) cancellation operation, equalization, a far end cross talk (FEXT) cancellation operation and/or a forward error correction (FEC) operation. An aggregate communication rate may be evenly or unevenly distributed among one or more links coupling the video signal source to the video rendering device. A plurality of links coupling the video signal source to said video rendering device may also be aggregated.

20 Claims, 13 Drawing Sheets

(51) Int. Cl.
*H04N 21/4363* (2011.01)
*H04N 21/6373* (2011.01)
*H04L 12/28* (2006.01)
*H04N 21/643* (2011.01)
*H04N 5/85* (2006.01)
*H04N 9/804* (2006.01)
*H04N 19/176* (2014.01)
*H04N 19/172* (2014.01)
*H04N 19/61* (2014.01)
*H04N 7/10* (2006.01)
*H04N 21/436* (2011.01)
*G09G 5/00* (2006.01)

(56) References Cited

U.S. PATENT DOCUMENTS

| | | | |
|---|---|---|---|
| 8,352,569 | B2 | 1/2013 | Hare |
| 2002/0061012 | A1 | 5/2002 | Thi et al. |
| 2004/0090924 | A1 | 5/2004 | Giaimo et al. |
| 2005/0151849 | A1 | 7/2005 | Fitzhugh et al. |
| 2006/0034295 | A1 | 2/2006 | Cherukuri et al. |
| 2006/0209745 | A1 | 9/2006 | MacMullan et al. |
| 2007/0014575 | A1 | 1/2007 | Kramer |
| 2007/0168497 | A1 | 7/2007 | Locker et al. |
| 2007/0280239 | A1 | 12/2007 | Lund |
| 2007/0299778 | A1 | 12/2007 | Haveson et al. |
| 2008/0129879 | A1 | 6/2008 | Shao et al. |
| 2008/0159304 | A1 | 7/2008 | Ozugur |
| 2010/0166051 | A1 | 7/2010 | Chung et al. |

METHOD AND SYSTEM FOR ENABLING VIDEO COMMUNICATION VIA ETHERNET UTILIZING ASYMMETRICAL PHYSICAL LAYER OPERATIONS

CROSS-REFERENCE TO RELATED APPLICATIONS/INCORPORATION BY REFERENCE

This application is a continuation of U.S. application Ser. No. 11/848,507, filed Aug. 31, 2007, which claims priority to U.S. Application No. 60/917,870, filed on May 14, 2007, the contents of which are incorporated in their entirety.

FIELD OF THE INVENTION

Certain embodiments of the invention relate to high speed wired communication. More specifically, certain embodiments of the invention relate to a method and system for enabling video communication via Ethernet utilizing asymmetrical physical layer operations.

BACKGROUND OF THE INVENTION

The multimedia consumer electronics market is rapidly evolving with increasingly sophisticated audio/video products. Consumers are becoming accustomed to high definition video in their home entertainment centers as well as high end graphic capabilities on personal computers. Several audio/video interface standards have been developed to link a digital audio/video source, such as a set-top box, DVD player, audio/video receiver, digital camera, game console or personal computer with an audio/video rendering device such as a digital television, a high definition video display panel or computer monitor. Examples of digital video interface technology available for consumer electronics comprise High-Definition Multimedia Interface (HDMI), Display Port, Digital Video Interface (DVI) and Unified Display Interface (UDI) for example. These audio/video interfaces may each comprise unique physical interfaces and communication protocols.

As high data rates are required, new transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

There may be instances where the data rate required for transmission in one direction may be much higher than the data rate required for transmission in the opposite direction, such as the delivery of interactive video from a central office to the consumer, for example. In this regard, the data rate for the transmission of video in one direction may be much higher than the data rate required for transmitting interactive commands in the opposite direction.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for enabling video communication via Ethernet utilizing asymmetrical physical layer operations, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for asymmetric physical layer (PHY) operations in video communications over Ethernet. Certain aspects of the invention may comprise reducing the data rate of video transmission by an upstream asymmetric Ethernet multi-rate PHY transceiver and transmitting via twisted-pair cabling to a downstream asymmetric Ethernet multi-rate PHY transceiver in a terminal device.

One embodiment of the invention may comprise a video processing system comprising asymmetric Ethernet multi-rate PHY and Ethernet functionality. In this regard, the asymmetric Ethernet multi-rate PHY and Ethernet functionality may replace HDMI video functionality utilized in some systems. For example, in a downstream transceiver, the asymmetric Ethernet multi-rate PHY may receive HDMI encoded video, audio and/or auxiliary data and utilize asymmetric Ethernet multi-rate PHY transceiver operations in place of HDMI PHY operations. In this regard, a source of HDMI encoded video audio and/or auxiliary data, for example may be a digital video disk (DVD) player that may be coupled with a video display panel via an Ethernet interface connector and twisted-pair cabling. The HDMI encoded video audio and/or auxiliary data may be processed by the asymmetric Ethernet multi-rate PHY transceiver in the DVD player and transported downstream via an Ethernet medium to an asymmetric Ethernet multi-rate PHY transceiver in the video display panel where the video and/or audio data may be rendered. The video data may be in any format such as standard, enhanced or high definition video format and may be encrypted or unencrypted and/or compressed or uncompressed. Notwithstanding, the video data may be processed by various video interface standards for example: HDMI, Display Port, Digital Visual Interface (DVI) or it may be native video for example. Furthermore, the video, audio and/or auxiliary data may not be HDMI encoded. For example, native video data may be encapsulated via an Ethernet media access control (MAC) processes within the DVD player. In this regard, the Ethernet encapsulated data may be processed by the asymmetric multi-rate Ethernet PHY transceiver and transported downstream via the Ethernet medium to the asymmetric multi-rate Ethernet PHY transceiver and an Ethernet MAC process in the video display panel where the native video and/or audio may be rendered.

Figure 1A:
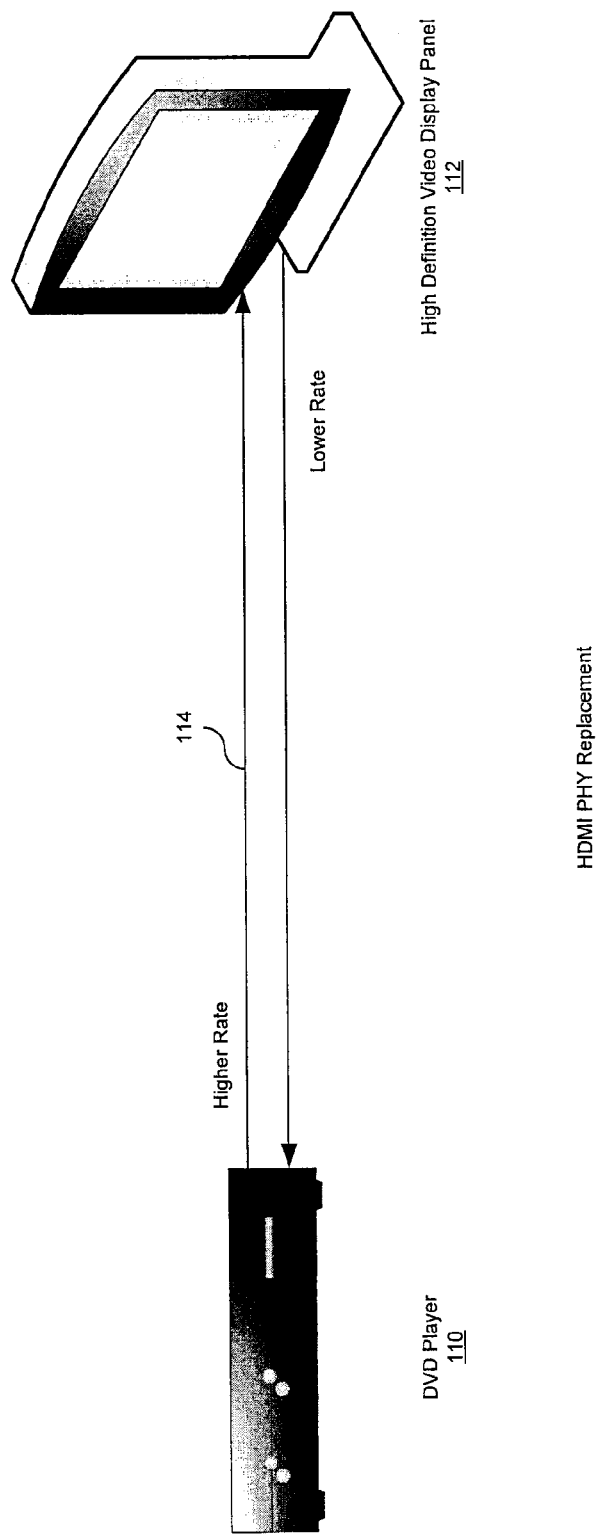
FIG. 1A is a diagram illustrating an exemplary system for transfer of video and/or audio data wherein a HDMI physical layer (PHY) is replaced with an asymmetric multi-rate Ethernet physical layer (PHY) connection, in accordance with an embodiment of the invention.

FIG. 1A is a diagram illustrating an exemplary system for transfer of video and/or audio data utilizing an asymmetric multi-rate Ethernet physical layer (PHY) connection, in accordance with an embodiment of the invention. The asymmetric multi-rate Ethernet physical layer (PHY) connection may be utilized to replace, for example, a HDMI physical layer (PHY). Referring to FIG. 1A, there is shown a DVD player 110, a high definition (HD) video display panel 112 and an Ethernet connection 114.

The DVD player 110 may be a source of video and/or audio data that may be accessible to users of the system. The DVD player 110 may be communicatively coupled with the HD video display panel 112 and they may communicate via an Ethernet connection 114. In another embodiment of the invention, the source of video and/or audio data may be for example a set-top box, a personal computer, a video game console and/or an audio/video receiver.

The HD video display panel 112 may comprise suitable logic, circuitry and or code to render and display visual images and audio based on received video, audio and/or auxiliary data from the DVD player 110. The HD video display panel 112 may be communicatively coupled with the DVD player 110 and they may communicate via an Ethernet connection 114.

The Ethernet connection 114 may comprise suitable logic, circuitry and/or code to support asymmetric multi-rate Ethernet PHY operations. An exemplary Ethernet connection may comprise category 5, category 5e, category 6, category 6a, category 7 or better cabling for example. However, the invention is not limited in this regard, for example, category 3-type 2 cables may be utilized as well. Moreover, cables may be shielded or unshielded. The Ethernet connection 114 may be enable quality of service mechanisms for example A/V bridging. The Ethernet connection 114 may be communicatively coupled with an Ethernet connector on the video display panel 112 and an Ethernet connector on the DVD player 110. The DVD player 110 and the HD video display panel 112 may be enabled to exchange video, audio and/or auxiliary data via the Ethernet connection 114. In this regard, the Ethernet connection 114 may be a point to point connection between the DVD player 110 and the HD video display panel 112. Moreover, the Ethernet connection 114 may span one or more bridges within a network coupling the DVD player 110 and the HD video display panel 112. In this regard, Ethernet frames comprising the video, audio and/or auxiliary data may comprise a network address for the DVD player 110 and/or the HD video display panel 112.

In operation, the DVD player 110 may comprise High Definition Multimedia Interface (HDMI) formatted video, audio and/or auxiliary data. The HDMI formatted video, audio and/or auxiliary data may contain information that may enable rendering of the video and/or audio data on the HD video display panel 112. Physical layer operations typically performed by an HDMI interface may be replaced with the asymmetric Ethernet multi-rate PHY operations for transmission via the Ethernet connection 114 to the HD video display panel 112. The HDMI formatted video and/or audio may not be encapsulated in Ethernet frames and/or may not utilize Ethernet addressing for point to point communication as shown in FIG. 1A. The video, audio and/or auxiliary data may be transmitted via the Ethernet connection 114 utilizing the asymmetric Ethernet multi-rate PHY wherein down stream data may be transferred from the DVD player 110 to the HD video display panel 112 at a higher rate and upstream data transferred from the HD video display panel 112 to the DVD player 110 may be transferred at a lower rate. For example, video data may be transferred downstream at a higher rate and control signals for example encryption keys and/or device identification may be transmitted upstream at a lower rate.

Figure 1B:
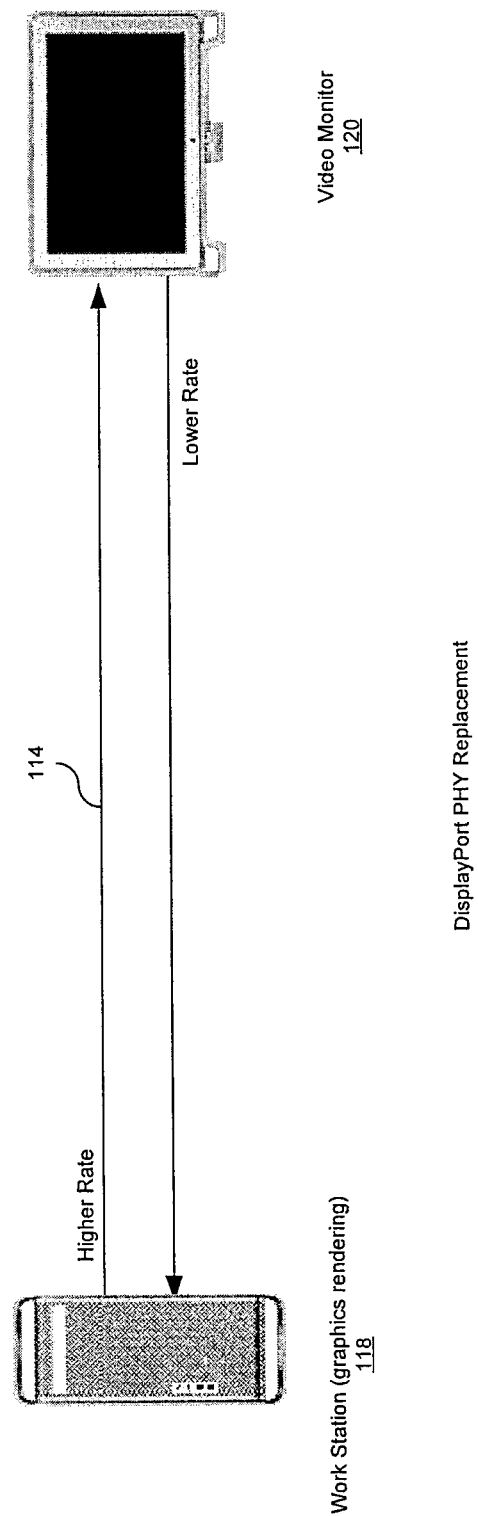
FIG. 1B is a diagram illustrating an exemplary system for transfer of graphics or video data wherein a Display Port physical layer (PHY) is replaced with an asymmetric multi-rate Ethernet physical layer (PHY) connection, in accordance with an embodiment of the invention.

FIG. 1B is a diagram illustrating an exemplary system for transfer of graphics or video data wherein a Display Port physical layer (PHY) is replaced with an asymmetric multi-rate Ethernet physical layer (PHY) connection, in accordance with an embodiment of the invention. Referring to FIG. 1B, there is shown a work station or personal computer 118, a video monitor 120 and an Ethernet connection 114.

The work station or personal computer 118 may comprise suitable logic, circuitry and or code to generate high end graphics or video data that may be transmitted to the video monitor 120 for rendering. The work station or personal computer 118 may be communicatively coupled with the video monitor 120 and they may communicate via an Ethernet connection 114.

The video monitor 120 may comprise suitable logic, circuitry and or code to render and display graphic images and/or audio based on received video and/or audio data from the work station or personal computer 118. The video monitor 120 may be communicatively coupled with the work station or personal computer 118 and they may communicate via an Ethernet connection 114.

The Ethernet connection 114 may comprise suitable logic, circuitry and or code that may enable asymmetric multi-rate Ethernet PHY operations. An exemplary Ethernet connection may comprise category 5 category 5e, category 6, category 6a, category 7 or better cabling for example. However, the invention is not limited in this regard, for example, category 3-type 2 cables may be utilized as well. Moreover, cables may be shielded or unshielded. The Ethernet connection 114 may be enable quality of service mechanisms for example A/V bridging. The Ethernet connection 114 may be communicatively coupled with an Ethernet connector on the video monitor 120 and an Ethernet connector on the work station or personal computer 118. The work station or personal computer 118 and the video monitor 120 may be enabled to exchange video, audio and/or auxiliary data via the Ethernet connection 114. In this regard, the Ethernet connection 114 may be a point to point connection between the work station or personal computer 118 and the video monitor 120. Moreover, the Ethernet connection 114 may span one or more bridges within a network coupling the work station or personal computer 118 and the video monitor 120. In this regard, Ethernet frames comprising the video, audio and/or auxiliary data may comprise a network address for the work station or personal computer 118 and/or the video monitor 120.

In operation, the work station or personal computer 118 may generate graphics or video data. Rather than sending the graphics or video data to the video monitor 120 via a digital interface standard, for example Display Port (DP), the work station or personal computer 118 may generate DP packets from the graphics or video data and replace the DP PHY with the asymmetric Ethernet multi-rate PHY and send the DP packets via the Ethernet connection 114. The DP packets may also contain information that may enable rendering of the graphics or video data on the video monitor 120. Physical layer operations typically performed by a DP digital interface may be replaced with the asymmetric Ethernet multi-rate PHY operations for transmission via the Ethernet connection 114 to the video monitor 120. The graphics or video data may be transmitted via the Ethernet connection 114 utilizing the asymmetric Ethernet multi-rate PHY wherein down stream data may be transferred from the a work station or personal computer 118 to the video monitor 120 at a higher rate and upstream data transferred from the video monitor 120 to the work station or personal computer 118 may be transferred at a lower rate. For example, graphics or video data may be transferred downstream at a higher rate and/or lower bandwidth control signals, for example encryption keys and/or device identification may be transmitted upstream at a lower rate.

Figure 1C:
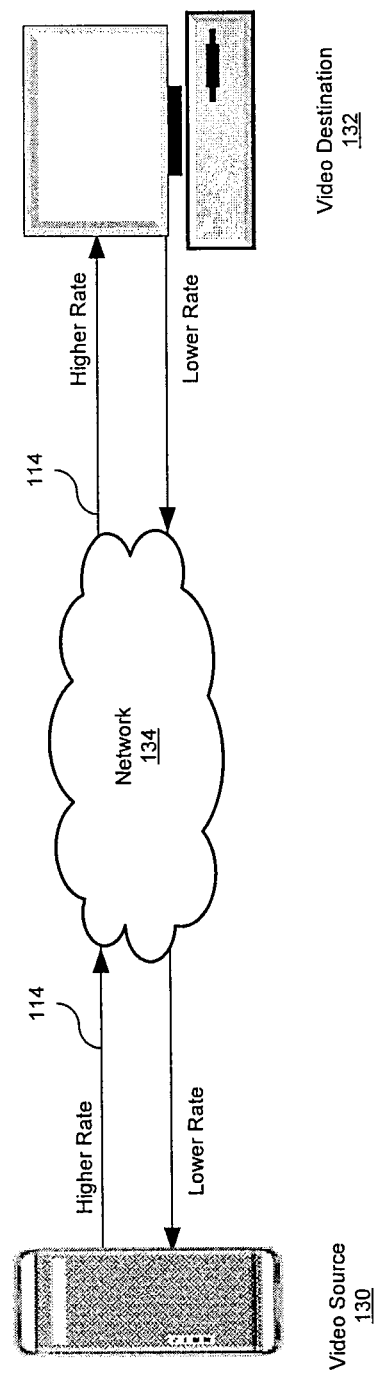
FIG. 1C is a diagram illustrating an exemplary system for transfer of video and/or audio data via a network wherein a HDMI physical layer (PHY) is replaced with an asymmetric multi-rate Ethernet physical layer (PHY) connection, in accordance with an embodiment of the invention.

FIG. 1C is a diagram illustrating an exemplary system for transfer of video and/or audio data via a network utilizing an asymmetric multi-rate Ethernet physical layer (PHY) connection, in accordance with an embodiment of the invention. Referring to FIG. 1C, there is shown a video source device 130, a video destination device 132, an Ethernet connection 114 and a network 134.

The video source device 130 may be accessible to users of the network. The video source device 130 may be communicatively coupled with the video destination device 132 via the Ethernet links 114 and the network 134. In various embodiments of the invention, the source of video and/or audio data may be for example a server, a personal computer, a video game console and/or an audio/video receiver. The invention is not limited to these examples and may comprise any suitable source of video data.

The video destination device 132 may comprise suitable logic, circuitry and or code to render and display visual images and audio based on received video, audio and/or auxiliary data from the video source 130. The video destination device 132 may be for example a client connected with a video display or a television. The invention is not limited to these examples and may comprise any suitable video destination devices. The video destination device 132 may be communicatively coupled with the video source device 130 via the Ethernet connections 114 and the network 134.

The Ethernet connection 114 may comprise suitable logic, circuitry and/or code to support asymmetric multi-rate Ethernet PHY operations. An exemplary Ethernet connection may comprise category 5, category 5e, category 6, category 6a, category 7 or better cabling for example. However, the invention is not limited in this regard, for example, category 3-type 2 cables may be utilized as well. Moreover, cables may be shielded or unshielded. The Ethernet connection 114 may be enable quality of service mechanisms for example A/V bridging. The Ethernet connection 114 may be communicatively coupled with an Ethernet connector on the video source device 130 and an Ethernet connector on a device within the network 134, for example an Ethernet bridge. In addition, the Ethernet connection 114 may be communicatively coupled with the video destination device 132. The video source device 130 and the video destination device 132 may be enabled to exchange video, audio and/or auxiliary data via the Ethernet connection 114 and the network 134.

The network 134 may comprise suitable logic, circuitry and or code to transfer data between one or more data source devices and one or more data destination devices. The network 134 may comprise one or more Ethernet bridges and may operate according to IEEE 802.1D standards for example. The network 134 may be communicatively coupled with the video source device 130 and the video destination device 132 via the Ethernet connections 114.

In operation, the video source 130 may comprise High Definition Multimedia Interface (HDMI) formatted video, audio and/or auxiliary data. The HDMI formatted video, audio and/or auxiliary data may contain information that may enable rendering of the video and/or audio data on the HD video display panel 112. Physical layer operations may be performed by the asymmetric Ethernet multi-rate PHY operations for transmission via the Ethernet connection 114 to the network 134. The HDMI formatted video and/or audio may be encapsulated in Ethernet frames and may utilize Ethernet addressing for communication via network 134 as shown in FIG. 1C. The encapsulated video and/or audio may be sent to the network 134 that may forward the data to one or more video destination devices 132. The video, audio and/or auxiliary data may be transmitted via the Ethernet connection 114 utilizing the asymmetric Ethernet multi-rate PHY. In addition, down stream data may be transferred from the video source device 130 to the video destination device 132 at a higher rate than upstream data for example security and/or control data may be received from the video destination device 132. Some embodiments of the invention may enable A/V bridging for quality of service operations. In this regard, adjustments may be made to the data within one or more transmitted streams that may improve alignment in the timing of the multiple streams of data.

Figures 2A, 2B:
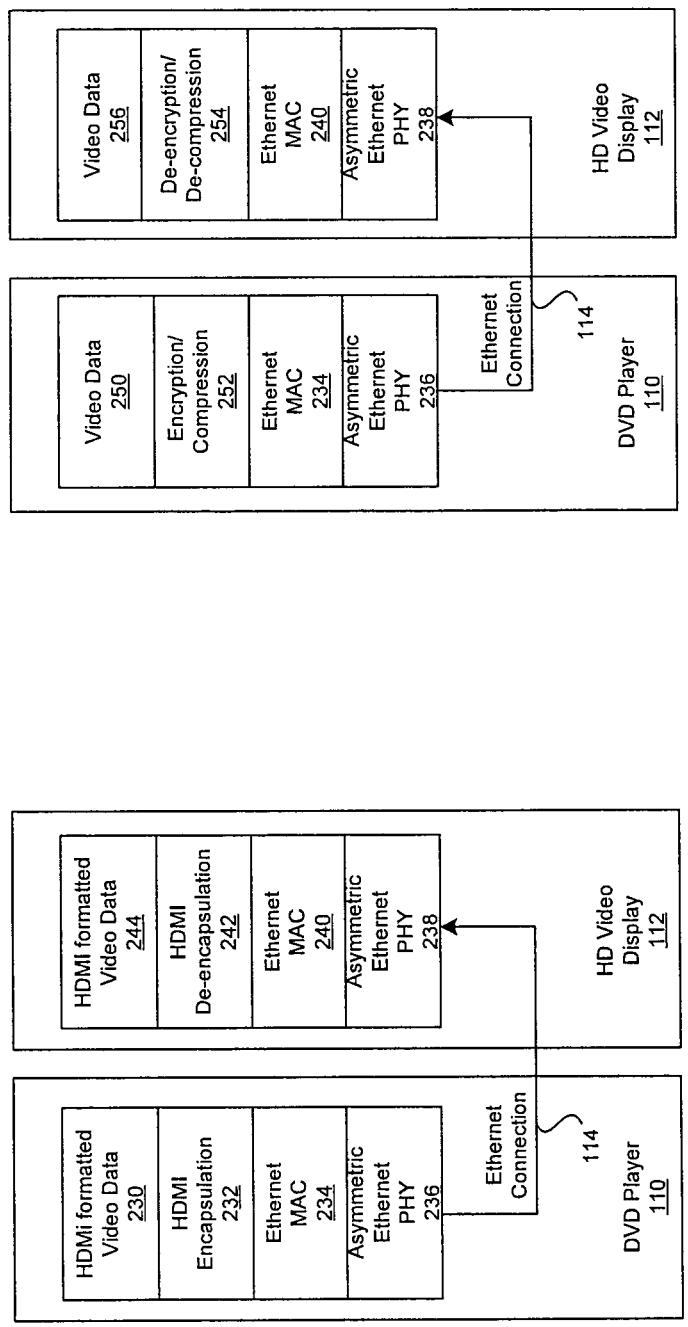
FIG. 2A is a diagram illustrating an exemplary transfer of HDMI formatted video data over an Ethernet connection from an upstream link partner for example, a DVD player to a downstream link partner for example, a HD video display panel, utilizing an asymmetric Ethernet multi-rate PHY replacement of an HDMI PHY, in accordance with an embodiment of the invention.
FIG. 2B is a diagram illustrating an exemplary transfer of native video data wherein video data may be encrypted and/or compressed prior to transmission over an Ethernet connection from an upstream link partner, for example, a DVD player to a downstream link partner, for example, a HD video display panel, utilizing an asymmetric Ethernet multi-rate PHY, in accordance with an embodiment of the invention.

FIG. 2A is a diagram illustrating an exemplary transfer of HDMI formatted video data over an Ethernet connection from an upstream link partner for example, a DVD player to a downstream link partner for example, a HD video display panel, utilizing an asymmetric Ethernet multi-rate PHY replacement of an HDMI PHY, in accordance with an embodiment of the invention. Referring to FIG. 2A, there is shown a DVD player 110, an HD video display panel 112 and an Ethernet connection 114. The DVD player 110 may comprise HDMI formatted video data 230 and a plurality of layered communication processes for example. The layered communication processes may comprise HDMI encapsulation process 232, Ethernet medium access control (MAC) process 234 and Ethernet PHY process 236. The HD video display 112 may comprise HDMI formatted video data 230 and a plurality of layered communication processes comprising the Ethernet PHY 238, the Ethernet MAC process 240 and the HDMI de-encapsulation process 242.

In one embodiment of the invention, the HDMI formatted video data 230 may be accessed by an application that may be executing within the DVD player 110. The HDMI formatted video data 230 may be encapsulated by an HDMI process 232. The HDMI encapsulated video data may contain information that enables rendering of the HDMI formatted video data 230 on the HD video display panel 112. The HDMI encapsulation process 232 may pass the HDMI encapsulated video data to the Ethernet MAC process 234. The Ethernet MAC process 234 may enable scheduling of transmission over the Ethernet connection 114 and may pass the HDMI encapsulated video data and protocol and/or link management control signals to the Ethernet PHY process 236. The Ethernet PHY process 236 may process the HDMI encapsulated video data with asymmetric multi-rate Ethernet PHY operations and enable transport of the HDMI encapsulated video data to the HD video display panel 112 via the Ethernet interface connection 114. The HDMI encapsulated video data may be received by the HD video display 112 via the asymmetric Ethernet PHY 238. The HDMI encapsulated video data may be processed and passed up to the MAC layer 240. The MAC layer may process the data and pass it to the de-encapsulation layer 242 wherein the HDMI formatted video is passed to higher layer processes and applications for rendering via the HD video display 112.

In addition, lower rate data may travel in a reverse direction from the HD video display 112 to the DVD player 110. This lower rate data may comprise control or security information for example. In this regard, the lower rate data may skip the HDMI blocks and undergo processing by Ethernet MAC blocks 234 and 240 as well as Ethernet PHY blocks 236 and 238.

FIG. 2B is a diagram illustrating an exemplary transfer of native video data over an Ethernet connection from an upstream link partner, for example, a DVD player to a downstream link partner, for example, a HD video display panel, utilizing an asymmetric Ethernet multi-rate PHY, in accordance with an embodiment of the invention. Referring to FIG. 2B, there is shown a DVD player 110, an HD video display panel 112 and an Ethernet connection 114. The DVD player 110 may comprise video data 250 and a plurality of layered communication processes. The layered communication processes may comprise an encryption/compression process 252, a medium access control (MAC) process 234 and an Ethernet PHY process 236. The HD video display 112 may comprise video data 144 and a plurality of layered communication processes comprising an Ethernet PHY 238, an Ethernet MAC process 240 and a de-encryption/decompression process 254.

In various embodiments of the invention, the video data 250 may be accessed by an application that may be executing within the DVD player 110. The video data 250 may or may not be processed by the encryption/compression block 252. For example, video data may remain unencrypted and uncompressed and may be sent to the MAC process 234. In some embodiments of the invention, the video data 250 may be encrypted but not compressed for example or it may be compressed but not encrypted or it may be encrypted and compressed. Following the encryption/compression block 252, the video data may be passed to the Ethernet MAC process 234.

The Ethernet MAC process 234 may enable scheduling of transmission over the Ethernet connection 114 and may pass the encrypted and/or compressed video data and protocol and/or link management control signals to the Ethernet PHY process 236. The Ethernet PHY process 236 may process with asymmetric multi-rate Ethernet PHY operations and enable transport of the encrypted and/or compressed video data to the HD video display panel 112 via the Ethernet interface connection 114 for rendering and video display.

In another embodiment of the invention, the Ethernet connection 114 may span one or more bridges between the upstream link partner and the downstream link partner. In this regard, the Ethernet MAC process 234 may encapsulate the video data in Ethernet frames. In addition, quality of service mechanisms for example A/V bridging may be enabled.

The video data may be received by the HD video display 112 via the asymmetric Ethernet PHY 238. The video data may be processed and passed up to the MAC layer 240. The MAC layer 240 may process the data and pass it to the de-encapsulation layer 242 wherein the video data is passed to higher layer processes and one or more applications for rendering via the HD video display 112.

In addition, lower rate data may travel in a reverse direction from the HD video display 112 to the DVD player 110. This lower rate data may comprise control or security information for example. In this regard, the lower rate data may undergo processing by Ethernet MAC blocks 234 and 240 as well as Ethernet PHY blocks 236 and 238.

Figure 2C:
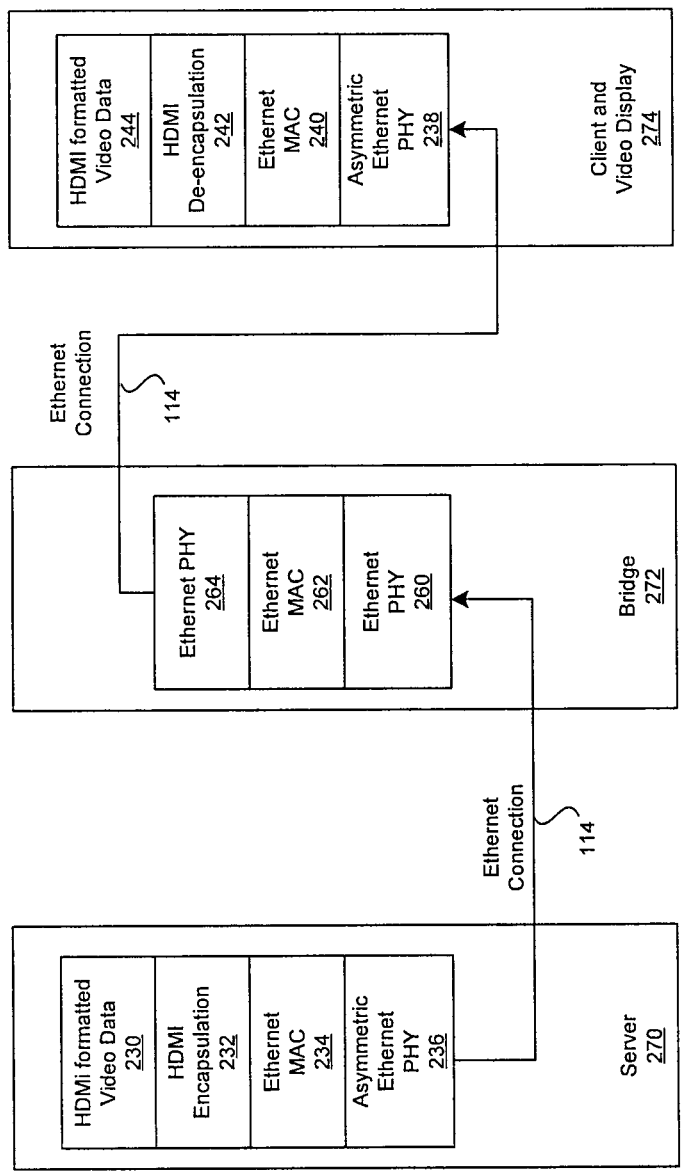
FIG. 2C is a diagram illustrating an exemplary transfer of HDMI formatted video data over an Ethernet connection from an upstream link partner for example, a server to an Ethernet bridge and then to a downstream link partner for example, a client and video display panel, utilizing an asymmetric Ethernet multi-rate PHY replacement of an HDMI PHY, in accordance with an embodiment of the invention.

FIG. 2C is a diagram illustrating an exemplary transfer of HDMI formatted video data via an Ethernet connection from a video source to a video destination device utilizing an asymmetric Ethernet multi-rate PHY, in accordance with an embodiment of the invention. Referring to FIG. 2C, there is shown an exemplary video source for example, a server 270, an Ethernet bridge 272, a client and video display 274 and an Ethernet connection 114. The server 270 may comprise a plurality of layered communication processes, and may handle storage and/or processing of HDMI formatted video data 230, for example. The layered communication processes may comprise HDMI encapsulation process 232, Ethernet medium access control (MAC) process 234 and Ethernet PHY process 236. The Ethernet bridge 272 may comprise one or more layered communication processes comprising Ethernet PHY 264, Ethernet MAC 262 and Ethernet PHY 260. The client and video display 274 may comprise HDMI formatted video data 230 and a plurality of layered communication processes that may comprise the Ethernet PHY 238, the Ethernet MAC process 240 and the HDMI de-encapsulation process 242.

In one embodiment of the invention, the HDMI formatted video data 230 may be accessed by an application that may be executing within the server 270. The HDMI formatted video data 230 may be encapsulated by an HDMI process 232. The HDMI encapsulated video data may comprise information that enables rendering of the HDMI formatted video data 230 on the client and video display 274. The HDMI encapsulation process 232 in the server 270 may pass the HDMI encapsulated video data to the Ethernet MAC process 234. The Ethernet MAC process 234 may enable scheduling of transmission over the Ethernet connection 114 and may pass the HDMI encapsulated video data, protocol and/or link management control signals to the Ethernet PHY process 236. The Ethernet PHY process 236 may process the HDMI encapsulated video data with asymmetric multi-rate Ethernet PHY operations and enable transport of the HDMI encapsulated video data to the Ethernet Bridge 272 via the Ethernet connection 114. The Ethernet bridge 272 may receive the HDMI encapsulated video data via the Ethernet PHY interface 260. The Ethernet PHY 260 may process the received signals with symmetric Ethernet PHY or asymmetric multi-rate Ethernet PHY operations and pass the HDMI encapsulated video data to the Ethernet MAC 262. The Ethernet MAC process 262 may enable scheduling of transmission via the Ethernet connection 114 to the client and video display 274 and may pass the HDMI encapsulated video data, protocol and/or link management control signals to the Ethernet PHY process 264. The Ethernet PHY process 264 may process the HDMI encapsulated video data with symmetric Ethernet PHY or asymmetric multi-rate Ethernet PHY operations and enable transport of the HDMI encapsulated video data to the client and video display 274. The client and video display 274 may receive the HDMI encapsulated video via the asymmetric Ethernet PHY 238. The asymmetric Ethernet PHY 238 may pass the HDMI encapsulated video data to Ethernet MAC 240 layer. The Ethernet MAC 240 layer may pass the HDMI encapsulated data to the HDMI de-encapsulation layer that may process the data and pass the data to higher layer processes for rendering of the video data via an application on the client and video display 274.

In addition, lower rate data may travel in a reverse direction from the client and video display 274 to one or more Ethernet bridges 272 and to the server 270. This lower rate data may comprise control or security information for example. In this regard, the lower rate data may skip the HDMI blocks and undergo processing by Ethernet MAC blocks 234, 240 and 262 as well as Ethernet PHY blocks 236, 238, 260 and 264.

Figure 3:
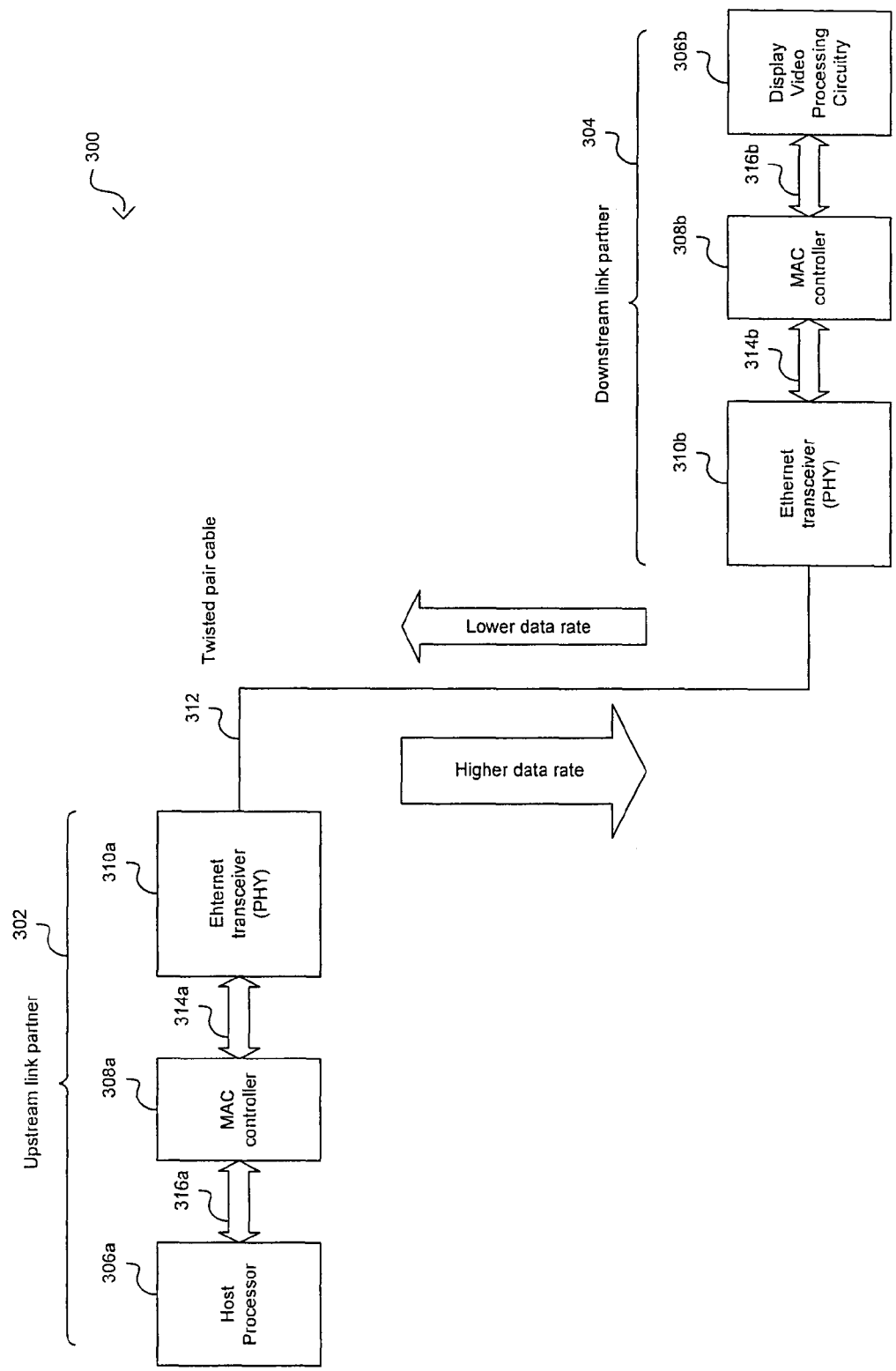
FIG. 3 is a block diagram illustrating an Ethernet system over twisted-pair cabling link between an upstream link partner and a downstream link transmitting asymmetric data traffic, in connection with an embodiment of the invention.

FIG. 3 is a block diagram illustrating an Ethernet system over twisted-pair cabling link between an upstream link partner and a downstream link partner for asymmetric data traffic, in connection with an embodiment of the invention. Referring to FIG. 3, there is shown a system 300 that comprises an upstream link partner 302 and a downstream link partner 304. The upstream link partner 302 may comprise a host processing block 306a, a medium access control (MAC) controller 308a, and a transceiver 304a. The downstream link partner 304 may comprise a display video processing block 306b, a MAC controller 308b, and a transceiver 310b. Notwithstanding, the invention is not limited in this regard.

The upstream link partner 302 and the downstream link partner 304 communicate via a cable 312. The cable 312 may be a four-pair unshielded twisted-pair (UTP) copper cabling, for example. Certain performance and/or specifications criteria for UTP copper cabling have been standardized. An exemplary Ethernet connection may comprise category 5 category 5e, category 6, category 6a, category 7 or better cabling for example. However, the invention is not limited in this regard, for example, category 3-type 2 cables may be utilized as well. Moreover, cables may be shielded or unshielded. For example, Category 5 or Category 5e cabling may provide the necessary performance for 10 Mbps Ethernet transmissions over twisted-pair cabling (10BASE-T). In another example, Category 5 cabling may provide the necessary performance for 1000 Mbps, or Gbps, Ethernet transmissions over twisted-pair cabling (1000BASE-T). In some embodiments of the invention, non standard speeds for example 2.5 Gbps and 5 Gbps may be utilized. In most instances, a lower category cable may generally have a greater insertion loss than a higher category cable.

The transceiver 310a may comprise suitable logic, circuitry, and/or code that may enable asymmetric Ethernet communication, such as transmission and reception of data, for example, between the upstream link partner 302 and the downstream link partner 304, for example. In this regard, the transceiver 310a may enable transmission at a high data rate to the downstream link partner 304 while also enabling reception at a low data rate from the downstream link partner 304. Similarly, the transceiver 310b may comprise suitable logic, circuitry, and/or code that may enable asymmetric Ethernet communication between the downstream link partner 304 and the upstream link partner 302, for example. In this regard, the transceiver 310b may enable transmission at a low data rate to the upstream link partner 302 while also enabling reception at a high data rate from the upstream link partner 302.

The data transmitted and/or received by the transceivers 310a and 310b may be formatted in a manner that may be compliant with the well-known OSI protocol standard, for example. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3. In this regard, the transceiver 310a may enable PHY layer operations that are utilized for asymmetric data communication with the downstream link partner 304. Moreover, the transceiver 310a may enable PHY layer operations that are utilized for asymmetric data communication with the upstream link partner 302.

The transceivers 310a and 310b may enable asymmetric multi-rate communications. In this regard, the data rate in the upstream and/or the downstream direction may be <10 Mbps, 10 Mbps, 100 Mbps, 1000 Mbps (or 1 Gbps) and/or 10 Gbps, for example. The transceivers 310a and 310b may support standard-based asymmetric data rates and/or non-standard asymmetric data rates. The transceivers 310a and 310b may utilize multilevel signaling in their operation. In this regard, the transceivers 310a and 310b may utilize pulse amplitude modulation (PAM) with various levels to represent the various symbols to be transmitted. For example, for 1000 Mbps Ethernet applications, a PAM5 transmission scheme may be utilized in each twisted-pair wire, where PAM5 refers to PAM with five levels $\{-2, -1, 0, 1, 2\}$. As a further example, for 10 Gbps Ethernet applications, a PAM 16 scheme may be utilized in each twisted-pair wire with levels $\{-15, -13, -11, -9, -7, -5, -3, -1, 1, 3, 5, 7, 9, 11, 13, 15\}$ where two successive PAM 16 symbols are used to define a 128 point, two dimensional constellation referred to in the IEEE 802.3 standard as 128 Double Square (DSQ).

The transceivers 310a and 310b may be configured to handle all the physical layer requirements, which may include, but are not limited to, packetization, data transfer and serialization/deserialization (SERDES), in instances where such an operation is required. Data packets received by the transceivers 310a and 310b from MAC controllers 308a and 308b, respectively, may include data and header information for each of the above six functional layers. The transceivers 310a and 310b may be configured to encode data packets that are to be transmitted over the cable 312 and/or to decode data packets received from the cable 312.

The MAC controller 308a may comprise suitable logic, circuitry, and/or code that may enable handling of data link layer, layer 2, operability and/or functionality in the upstream link partner 302. Similarly, the MAC controller 308b may comprise suitable logic, circuitry, and/or code that may enable handling of layer 2 operability and/or functionality in the downstream link partner 304. The MAC controllers 308a and 308b may be configured to implement Ethernet protocols, such as those based on the IEEE 802.3 standard, for example. Notwithstanding, the invention is not limited in this regard.

The MAC controller 308a may communicate with the transceiver 310a via an interface 314a and with the host processing block 306a via a bus controller interface 316a. The MAC controller 308b may communicate with the transceiver 310b via an interface 314b and with the display video processing block 306b via a bus controller interface 316b. The interfaces 314a and 314b correspond to Ethernet interfaces that comprise protocol and/or link management control signals. The interfaces 314a and 314b may be multi-rate interfaces. The bus controller interfaces 316a and 316b may correspond to PCI or PCI-X interfaces. Notwithstanding, the invention is not limited in this regard.

The host processing block 306a and the display video processing block 306b may comprise suitable logic, circuitry and/or code to enable graphics processing and/or rendering operations. The host processing block 306a and/or the display video processing block 306b may comprise dedicated graphics processors and/or dedicated graphics rendering devices. The host processing block 306a and the display video processing block 306b may be communicatively coupled with the MAC 308a and the MAC 308b respectively via the bus controller interfaces 316a and 316b respectively.

In the embodiment of the invention illustrated in FIG. 3, the host processing block 306a and the display video processing block 306b may represent layer 3 and above, the MAC controllers 308a and 308b may represent layer 2 and above and the transceivers 310a and 310b may represent the operability and/or functionality of layer 1 or the PHY layer. In this regard, the host processing block 306a and the display video processing block 306b may comprise suitable logic, circuitry, and/or code that may enable operability and/or functionality of the five highest functional layers for data packets that are to be transmitted over the cable 312. Since each layer in the OSI model provides a service to the immediately higher interfacing layer, the MAC controllers 308a and 308b may provide the necessary services to the host processing block 306a and the display video processing block 306b to ensure that data are suitably formatted and communicated to the transceivers 310a and 310b. During transmission, each layer may add its own header to the data passed on from the interfacing layer above it. However, during reception, a compatible device having a similar OSI stack may strip off the headers as the message passes from the lower layers up to the higher layers.

Figure 4:
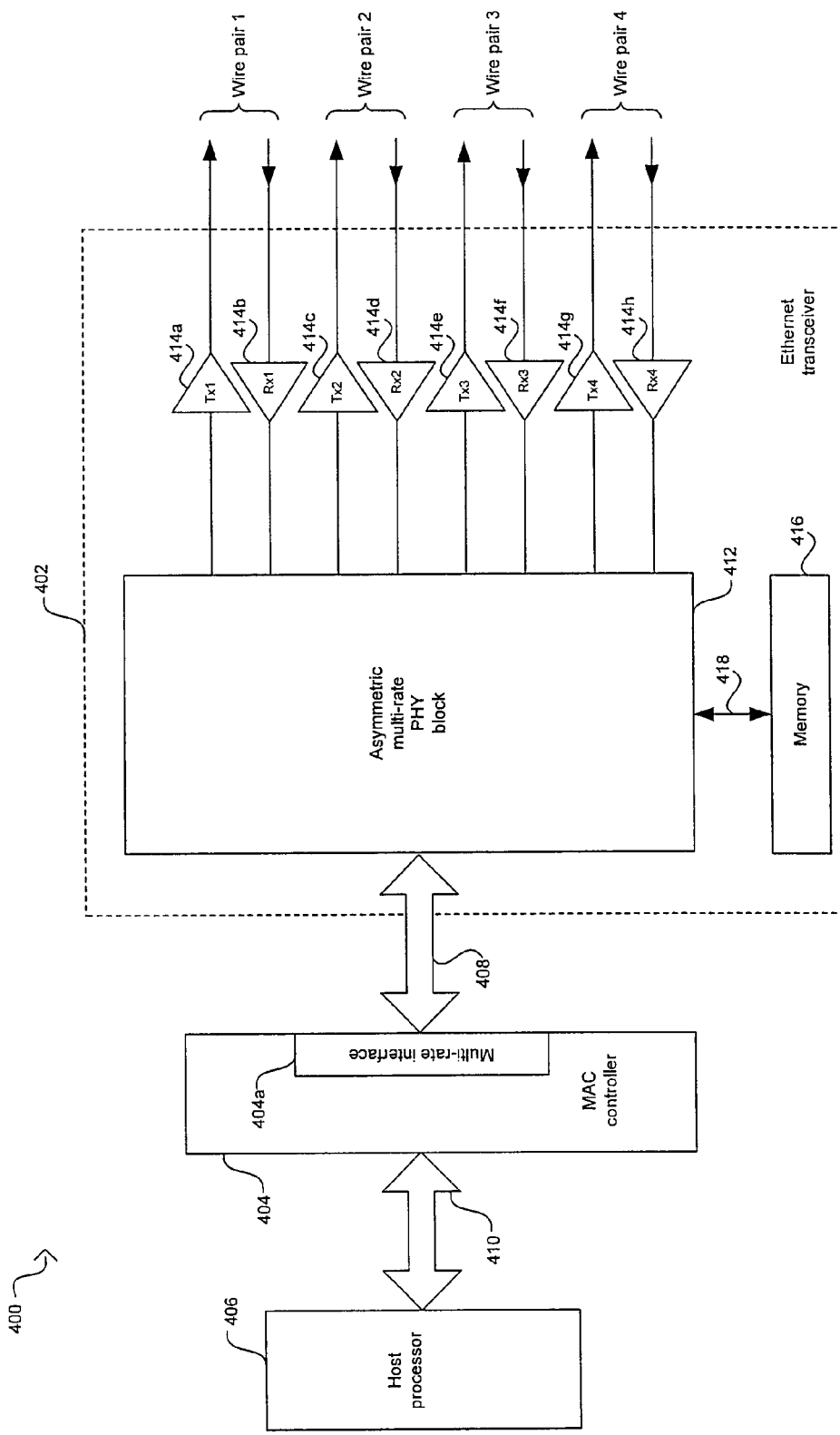
FIG. 4 is a block diagram illustrating an exemplary Ethernet transceiver architecture comprising an asymmetric multi-rate PHY, in accordance with an embodiment of the invention.

FIG. 4 is a block diagram illustrating an exemplary Ethernet transceiver architecture comprising an asymmetric multi-rate PHY, in accordance with an embodiment of the invention. Referring to FIG. 4, there is shown a link partner 400 that may comprise a transceiver 402, a MAC controller 404, a host processing block 406, an interface 408, and a bus controller interface 410.

The transceiver 402 may be an integrated device that comprises an asymmetric multi-rate PHY block 412, a plurality of transmitters 414a, 414c, 414e, and 414g, a plurality of receivers 414b, 414d, 414f, and 414h, a memory 416, and a memory interface 418. The operation of the transceiver 402 may be the same as or substantially similar to the transceivers 310a and 310b as described in FIG. 3. For example, when the transceiver 402 is utilized in an upstream link partner, the transceiver 402 may enable a high rate for data transmission and a low rate for data reception. In another example, when the transceiver 402 is utilized in a downstream link partner, the transceiver 402 may enable a low rate for data transmission and a high rate for data reception. In this regard, the transceiver 402 may provide layer 1 or PHY layer operability and/or functionality that enables asymmetric data traffic.

Similarly, the operation of the MAC controller 404, the host processing block 406, the interface 408, and the bus controller 410 may be the same as or substantially similar to the respective MAC controllers 308a and 308b, the host processing block 306a and the display video processing block 306b, interfaces 314a and 314b, and bus controller interfaces 316a and 316b as disclosed in FIG. 3. In this regard, the MAC controller 404, the host processing block 406, the interface 408, and the bus controller 410 may enable different data transmission and/or data reception rates when implemented in an upstream link partner or a downstream link partner. The MAC controller 404 may comprise a multi-rate interface 404a that may comprise suitable logic, circuitry, and/or code to enable communication with the transceiver 402 at a plurality of data rates via the interface 408.

The asymmetric multi-rate PHY block 412 in the transceiver 402 may comprise suitable logic, circuitry, and/or code that may enable operability and/or functionality of PHY layer requirements for asymmetric data traffic. The asymmetric multi-rate PHY block 412 may communicate with the MAC controller 404 via the interface 408. In one aspect of the invention, the interface 408 may be configured to utilize a plurality of serial data lanes for receiving data from the asymmetric multi-rate PHY block 412 and/or for transmitting data to the asymmetric multi-rate PHY block 412, in order to achieve higher operational speeds such as Gbps, 10 Gbps or higher speeds for example. The asymmetric multi-rate PHY block 412 may be configured to operate in one or more of a plurality of communication modes, where each communication mode implements a different communication protocol. These communication modes may include, but are not limited to, IEEE 802.3, 10GBASE-T, other similar protocols and/or non-standard communication protocols that enable asymmetric data traffic. The asymmetric multi-rate PHY block 412 may be configured to operate in a particular mode of operation upon initialization or during operation. The asymmetric multi-rate PHY block 412 may also be configured to operate in an extended range mode.

The asymmetric multi-rate PHY block 412 may be coupled to memory 416 through the memory interface 418, which may be implemented as a serial interface or a bus. The memory 416 may comprise suitable logic, circuitry, and/or code that may enable storage or programming of information that includes parameters and/or code that may effectuate the operation of the asymmetric multi-rate PHY block 412. The parameters may comprise configuration data and the code may comprise operational code such as software and/or firmware, but the information need not limited in this regard. Moreover, the parameters may include adaptive filter and/or block coefficients for use by the asymmetric multi-rate PHY block 412, for example.

The transmitters 414a, 414c, 414e, and 414g may comprise suitable logic, circuitry, and/or code that may enable transmission of data from a transmitting link partner to a remote link partner via the cable 312 in FIG. 3, for example. In this regard, when the transmitting link partner is an upstream link partner, the transmitters 414a, 414c, 414e, and 414g may operate at a higher data rate than the data rate received from the downstream link partner. Similarly, when the when the transmitting link partner is a downstream link partner, the transmitters 414a, 414c, 414e, and 414g may operate at a lower data rate than the data rate received from the upstream link partner.

The receivers 414b, 414d, 414f, and 414h may comprise suitable logic, circuitry, and/or code that may enable receiving data from a remote link partner via the cable 312, for example. In this regard, when the receiving link partner is an upstream link partner, the receivers 414b, 414d, 414f, and 414h may operate at a lower data rate than the data rate transmitted to the downstream link partner. Similarly, when the when the receiving link partner is a downstream link partner, the receivers 414b, 414d, 414f, and 414h may operate at a higher data rate than the data rate transmitted to the upstream link partner.

Each of the four pairs of transmitters and receivers in the transceiver 402 may correspond to one of the four wire pairs in the cable 312. For example, transmitter 414a and receiver 414b may be utilized to asymmetrically communicate data with a remote link partner via the first wire pair in the cable 312. Similarly, transmitter 414g and receiver 414h may be utilized to asymmetrically communicate data with a remote link partner via the fourth wire pair in the cable 312. In this regard, at least one of the four transmitter/receiver pairs may be enabled to provide the appropriate communication rate. The above-disclosed scheme may be applied to fewer, or greater, number of wires, for example.

Figure 5:
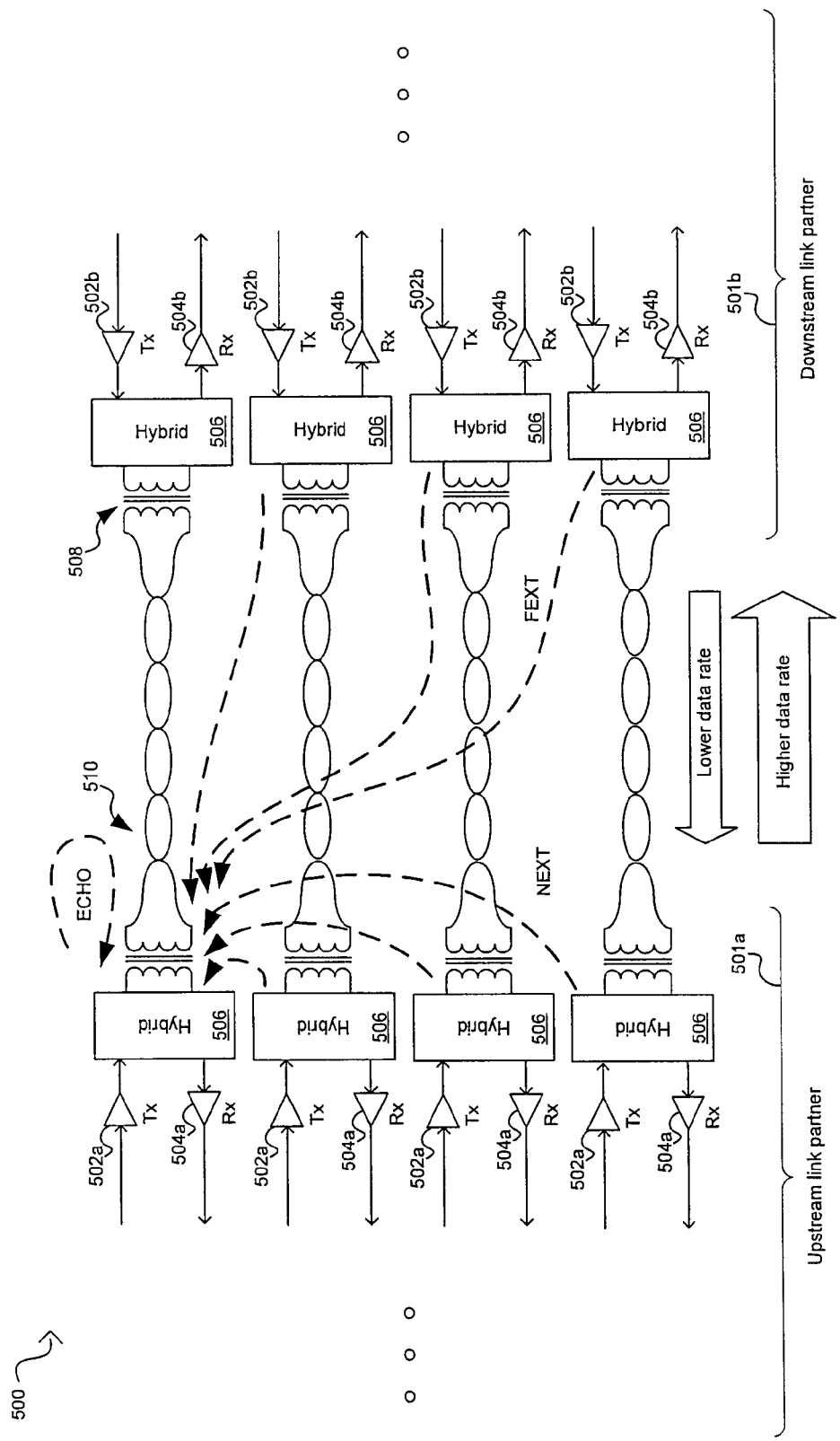
FIG. 5 is a block diagram illustrating ECHO, NEXT, and FEXT channel conditions in an Ethernet system, in accordance with an embodiment of the invention.

FIG. 5 is a block diagram illustrating ECHO, NEXT, and FEXT channel conditions in an Ethernet system, in accordance with an embodiment of the invention. Referring to FIG. 5, there is shown an asymmetric Ethernet system 500 that may comprise an upstream link partner 501a and a downstream link partner 501b. The upstream link partner 501a and the downstream link partner 501b may asymmetrically communicate data via four twisted-pair wires 510 in full duplex operation. Each of the four twisted-pair wires 510 may support a portion of the data rates that may be necessary to provide the aggregate upstream and downstream data traffic. In this regard, each of the four twisted-pair wires 510 may support an equal or even or an unequal or uneven portion of the aggregate upstream and downstream data traffic.

The upstream link partner 501a may comprise four hybrids 506. Each hybrid 506 in the upstream link partner 501a may be communicatively coupled to a transmitter 502a, a receiver 504a, and to one of the four twisted-pair wires 510. Similarly, the downstream link partner 501b may comprise four hybrids 506. Each hybrid 506 in the downstream link partner 501b may be communicatively coupled to a transmitter 502b, a receiver 504b, and to one of the four twisted-pair wires 510. The portions of the upstream link partner 501a and the downstream link partner 501b shown in FIG. 5 may correspond to a portion of the physical (PHY) layer operations supported by the upstream link partner 501a and by the downstream link partner 501b respectively.

Each hybrid 506 in the upstream link partner 501a or in the downstream link partner 501b may be communicatively coupled to or comprise a transformer 508. The hybrid 506 may comprise suitable logic, circuitry, and/or code that may enable separating the transmitted and received signals from a twisted-pair wire 510. The transmitters 502a and 502b may comprise suitable logic, circuitry, and/or code that may enable generating signals to be transmitted to a link partner at the other end of the link via a hybrid 506 and a twisted-pair wire 510. In this regard, the transmitters 502a may operate at a higher data rate than the transmitters 502b. The receivers 304 may comprise suitable logic, circuitry, and/or code that may enable processing signals received from a link partner at the other end of the link via a twisted-pair wire 510 and a hybrid 506. In this regard, the receivers 504a may operate at a lower data rate than the receivers 504b.

During operation, several conditions may occur in each of the twisted-pair wires 510. For example, intersymbol interference (ISI) may occur as a result of frequency dependent wire attenuation. As shown in FIG. 5, an ECHO component may be received in a twisted-pair wire 510 from an echo that results from the transmitter 502a in the upstream link partner 501a on the same twisted-pair wire 510. A near-end crosstalk (NEXT) component may also be received in a twisted-pair wire 510 from the local transmitters 502a corresponding to the three adjacent twisted-pair wires 510 in the upstream link partner 501a. Moreover, a far-end crosstalk (FEXT) component may also be received in a twisted-pair wire 510 from the transmitters 502b in the downstream link partner 501b at the other end of the link. Similar conditions may also occur in the downstream link partner 501b, for example.

Figure 6:
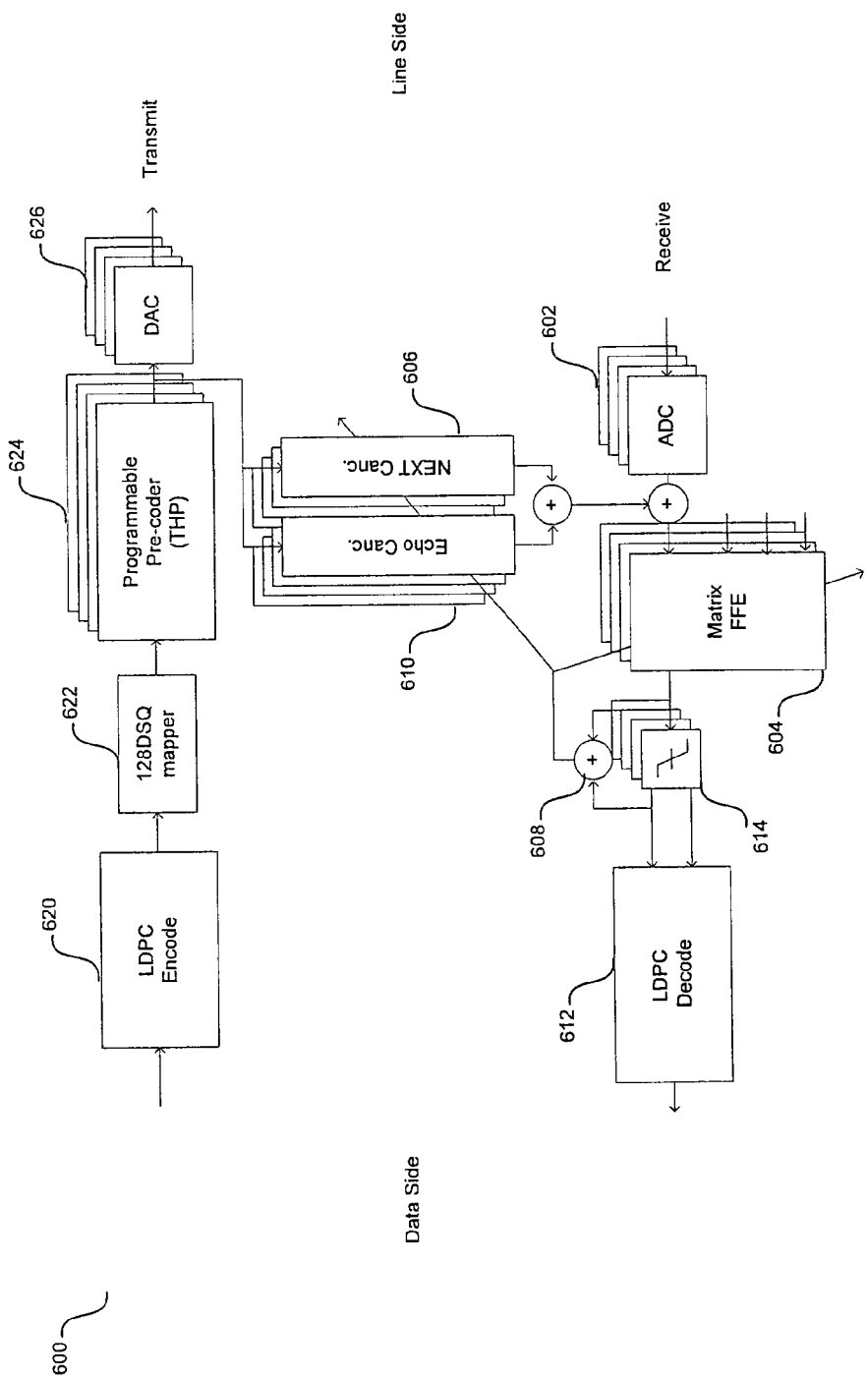
FIG. 6 is a block diagram illustrating exemplary 10 Gigabit signal processing operations for received signals in an Ethernet system utilized for asymmetric data traffic, in accordance with an embodiment of the invention.

FIG. 6 is a block diagram illustrating exemplary 10 Gigabit signal processing operations for receive and transmit signals in an Ethernet system utilized for asymmetric data traffic, in accordance with an embodiment of the invention. Referring to FIG. 6, there is shown a signal processing system 600 that may provide a portion of the signal processing performed by the physical (PHY) layer operations in an Ethernet transceiver that supports asymmetric multi-rate operation. For example, the signal processing system 600 may be implemented in the asymmetric multi-rate PHY block 412 and/or in the receivers 414b, 414d, 414f, and 414h in FIG. 4. The signal processing system 600 may comprise an analog-to-digital converter (ND) 602, a matrix feed-forward equalizer (FFE) 604, NEXT cancellers 606, an adder 608, an ECHO canceller 610, a low density parity check code (LDPC) decoder 612, an adaptive pre-filter 614, an LDPC encoder 620, a 128 Double Square (DSQ) mapper 622 a Tomlinson Harashima pre-coder (THP) 624 and a digital to analog converter 626.

The A/D 602 may comprise suitable logic, circuitry, and/or code that may enable converting analog signals received via a twisted-pair wire into digital signals. The output of the A/D 602 may be communicated to the matrix FFE 604. The matrix FFE 604 may comprise suitable logic, circuitry, and/or code that may enable removal of precursor ISI to make the channel minimum-phase and to whiten the noise in the channel. The NEXT cancellers 606 may comprise suitable logic, circuitry, and/or code that may enable canceling at least a portion of the NEXT component received in the twisted-pair wire from the local transmitters corresponding to the three adjacent twisted-pair wires. The ECHO canceller 610 may comprise suitable logic, circuitry, and/or code that may enable canceling at least a portion of the ECHO component received in the twisted-pair wire from the local transmitter on the same twisted-pair wire.

The adder 608 may comprise suitable logic, circuitry, and/or code that may enable adding the output of the matrix FFE 604, the NEXT cancellers 606, and/or the ECHO canceller 610 to generate a postcursor channel impulse response, $z_{n,1}$. The adaptive pre-filter 614 and the LDPC decoder 612 may comprise suitable logic, circuitry and/or code that may enable mitigating the ISI that may result from the postcursor impulse response and, decoding low density parity check coded data. The adaptive pre-filter 614 and LDPC decoder 612 may receive as inputs the postcursor channel impulse responses, $z_{n,2}$, $z_{n,3}$, and $z_{n,4}$ corresponding to the other twisted-pair wires. The LDPC decoder 612 may generate the detected bits that correspond to the received analog signal.

Prior to an Ethernet transmission, the low density parity check code (LDPC) encoder 620 may comprise suitable logic, circuitry and/or code for enabling error correction. The output of the LDPC encoder 620 may be sent to the 128 DSQ mapper 622. The 128 DSQ mapper 622 may be utilized in the implementation of 16 level pulse amplitude modulation 16 (PAM16) for each twisted-pair wire. The output of the 128 DSQ mapper 622 may be sent to the THP 624. The THP 624 may comprise four THPs, one for each twisted pair. The THP 624 may comprise suitable logic, circuitry and or code that may enable spectral shaping in the transmitter and thus reduce receiver complexity. The output of the THP 624 may be communicated to the DAC 626. The DAC 626 may comprise suitable logic, circuitry and/or code that may enable converting signals from digital to analog for transmission via a twisted-pair wire cabling. The invention is not limited with regard to any specific signal processing operations or functionality. Any suitable signal processing methods and/or system may be utilized.

Figure 7:
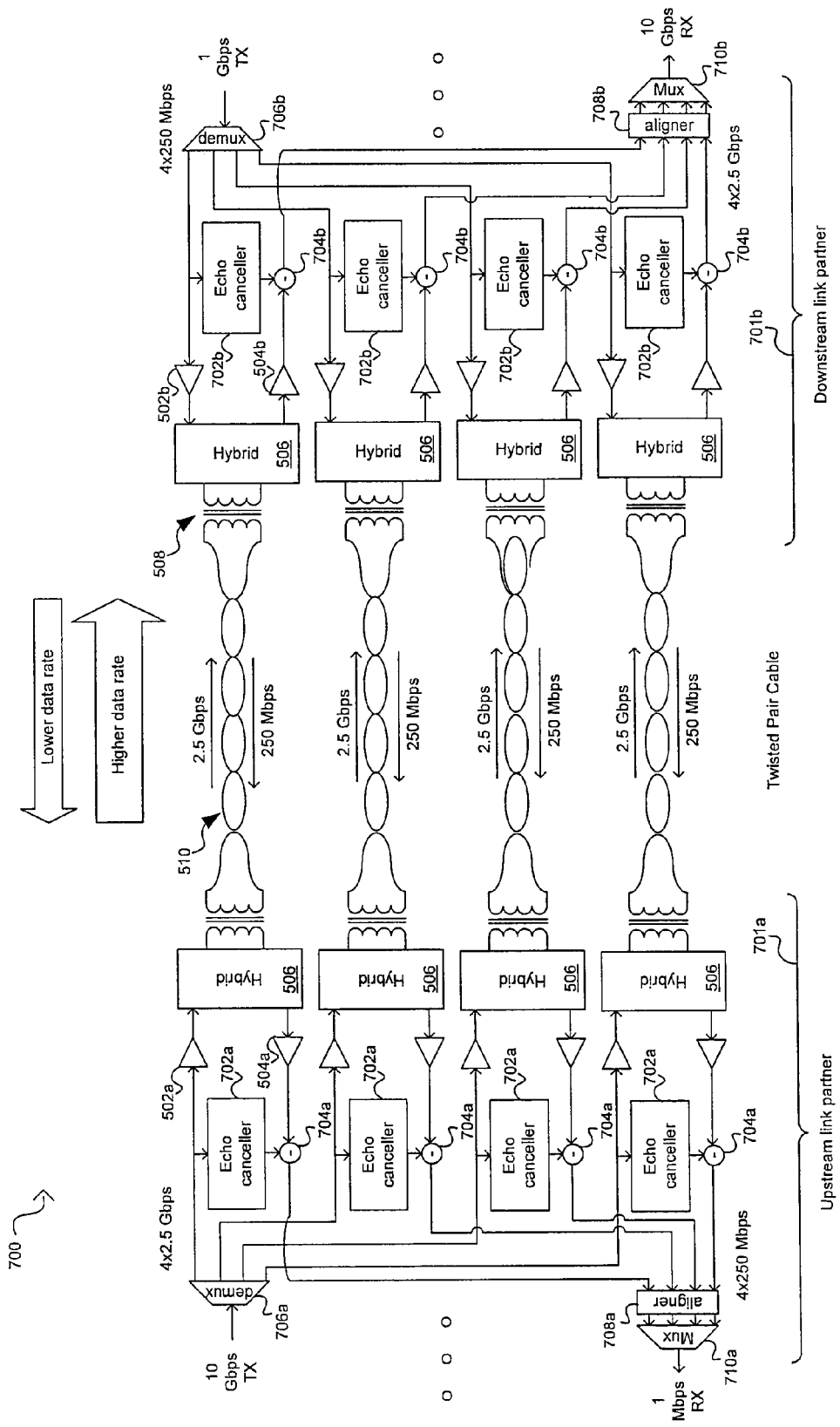
FIG. 7 is a block diagram of a multi-rate Ethernet system for asymmetric data traffic that utilizes 10 Gigabit signal processing resources in a four-pair extended range mode, in accordance with an embodiment of the invention.

FIG. 7 is a block diagram of a multi-rate Ethernet system for asymmetric data traffic that utilizes 10 Gigabit signal processing resources in a four-pair extended range mode, in accordance with an embodiment of the invention. Referring to FIG. 7, there is shown an asymmetric multi-rate Ethernet system 700 that may comprise an upstream link partner 701a and a downstream link partner 701b. The upstream link partner 701a may correspond to, for example, the entry DVD player in FIG. 1, while the downstream link partner 701b may correspond to, for example, the high definition video display panel 112. The asymmetric multi-rate Ethernet system 700 may support a plurality of asymmetric data rates or modes of operation over four-pair twisted-pair wire, including the ability to provide 1 Gbps or 10 Gbps, for example as shown in FIG. 7. In another embodiment of the invention, the asymmetric multi-rate Ethernet system 700 may operate in an extended range mode of operation that provides 10 Mbps in the downstream direction and 2 Mbps in the upstream direction, for example. In this regard, the extended range operation may be achieved by utilizing the 2 Mbps and 10 Mbps lower communication data rates, that is, data rates below the 1 Gbps or 10 Gbps that may be achieved by the signal processing operations enabled in either the upstream link partner 701a or the downstream link partner 701b.

The upstream link partner 701a may comprise four hybrids 506 as described in FIG. 5. Notwithstanding, the invention is not so limited and may support various implementations of a hybrid circuitry. Each hybrid 506 in the upstream link partner 701a may be communicatively coupled to a transmitter 502a, a receiver 504a, and to one of the four twisted-pair wires 510 also as described in FIG. 5. Associated with each hybrid 506 in the upstream link partner 701a may also be an echo canceller 702a and a subtractor 704a. The upstream link partner 701a may also comprise a demultiplexer (demux) 706a, an aligner 708a, and a multiplexer (mux) 710a.

Similarly, the downstream link partner 701b may comprise four hybrids 506. Each hybrid 506 in the downstream link partner 701b may be communicatively coupled to a transmitter 502b, a receiver 504b, and to one of the four twisted-pair wires 510 as described in FIG. 5. Associated with each hybrid 506 in the downstream link partner 701b are also an echo canceller 504b and a subtractor 506b. The remote link partner 701b may also comprise a demux 706b, an aligner 708b, and a mux 710b. The portions of the upstream link partner 701a and downstream link partner 701b shown in FIG. 7 may correspond to a portion of the physical (PHY) layer operations supported by the upstream link partner 701a and downstream link partner 701b respectively.

The demux 706a may comprise suitable logic, circuitry, and/or code that may enable separating an exemplary 10 Gbps downstream signal into four 2.5 Gbps signals for transmission over the four twisted-pair wires. Similarly, the demux 706b may comprise suitable logic, circuitry, and/or code that may enable separating an exemplary 1 Gbps upstream signal into four 250 Mbps signals for transmission over the four twisted-pair wires. The aligner 708a may comprise suitable logic, circuitry, and/or code that may enable aligning the 250 Mbps signals received from each of the four twisted-pair wires by the upstream link partner 701a. Similarly, the aligner 708b may comprise suitable logic, circuitry, and/or code that may enable aligning the 2.5 Gbps signals received from each of the four twisted-pair wires by the downstream link partner 701b. The mux 710a may comprise suitable logic, circuitry, and/or code that may enable combining the aligned 250 Mbps signals from the aligner 708a to generate the received 1 Gbps upstream signal. Similarly, the mux 710b may comprise suitable logic, circuitry, and/or code that may enable combining the aligned 2.5 Gbps signals from the aligner 708a to generate the received 10 Gbps downstream signal.

The echo cancellers 702a and 702b may comprise suitable logic, circuitry, and/or code that may enable at least partial cancellation of the ECHO component in the corresponding signal received via the receivers 504a and 504b, respectively, associated with the same twisted-pair wire. The subtractors 704a and 704b may comprise suitable logic, circuitry, and/or code that may enable cancellation of the ECHO component from the received signal.

In operation, the upstream link partner 701a may separate a 10 Gbps signal to be transmitted into four 2.5 Gbps signals via the demux 706a. Each signal to be transmitted is processed by a transmitter 502a before being communicated to the corresponding twisted-pair wire via a hybrid 506. The four transmitted signals may arrive at the downstream link partner 701b, where each of the signals may be processed by a receiver 504b before echo cancellation occurs from the operation of a corresponding echo canceller 702b and subtractor 704b. The four received 2.5 Gbps signals may be aligned in the aligner 708b before being combined in the mux 710b into a 10 Gbps received downstream signal.

Similarly, the downstream link partner 701b may separate a 1 Gbps signal to be transmitted into four 250 Mbps signals via the demux 706b. Each signal to be transmitted may be processed by a transmitter 502b before being communicated to the corresponding twisted-pair wire via a hybrid 506. The four transmitted signals may arrive at the upstream link partner 701a, where each of the signals may be processed by a receiver 504a before echo cancellation occurs from the operation of a corresponding echo canceller 702a and subtractor 704a. The four received 500 kbps signals may be aligned in the aligner 708a before being combined in the mux 710a into a 1 Gbps received upstream signal.

The upstream link partner 701a and the downstream link partner 701b may communicate via all four twisted-pair wires 510 in full duplex operation to provide an aggregate of 1 Gbps for the upstream data rate and 10 Gbps for the downstream data rate. Reducing the communication rate to 2 Mbps and 10 Mbps from, for example, 100 Mbps or higher, while utilizing the higher communication rate PHY layer signal processing operations, may enable extending the range, that is, extending the standard length, of the twisted-pair wires 510. In this regard, the asymmetric multi-rate operations of the upstream link partner 701a and a downstream link partner 701b may support Gigabit PHY layer operations that may utilize multi-level signaling to transmit multiple bits per clock interval. PAM-5 may be used to transmit 2 bits per symbol and reduce the symbol rate to carry on each twisted-pair wire 510. In this regard, multi-level signaling may be applied at 100 Mbps, 10 Mbps, or <10 Mbps rates, that is, at lower communication rates, to permit operation at reduced symbol rates. For example, 25 Mbps may be carried on a single twisted-pair wire at a 12.5 Msps symbol rate. Reducing the symbol rate enables transmission over longer cable ranges. The signal processing operations available in a Gigabit PHY layer may support 2, 3, 4, or 5 levels of signaling with no increase in complexity, for example.

Reducing the communication rate may also enable utilizing cabling with higher insertion loss while maintaining the same standard length. For example, for Gigabit operations, a Category 5 or Category 5e cable may be utilized. Reducing the communication rate in one direction in the asymmetric data traffic to 100 Mbps, for example, may enable utilizing cabling with higher insertion loss than a Category 5 or Category 5e cabling while maintaining the 100 m length requirement under the IEEE 802.3 standard. The insertion loss of a twisted-pair wire cable increases as the square root of frequency. Insertion loss, in dB, is directly proportional to cable length. Applying Gigabit signal processing operation at 100 Mbps data rate may increase the cable range. NEXT cancellation operations also improve the SNR of each received signal and may be applied at 100 Mbps and 10 Mbps rates to achieve similar improvements in SNR and further extend the cable range at those reduced communication rates.

The asymmetric multi-rate Ethernet system 700 need not be limited to achieving a lower communication rate in any one direction by evenly distributing the data rate over each of the four twisted-pair wires utilized. In another embodiment of the invention, the asymmetric multi-rate Ethernet system 700 may achieve a lower communication rate by distributing the data rate unevenly over each of the four twisted-pair wires utilized. For example, for a 10 Mbps downstream data rate, the first twisted-pair wire may support 1 Mbps, the second twisted-pair wire may support 2 Mbps, the third twisted-pair wire may support 3 Mbps, and the fourth twisted-pair wire may support 4 Mbps, to achieve an aggregate of 10 Mbps. A similar approach may be followed for generating an aggregate upstream data rate from unevenly distributed data rates over each of the four twisted-pair wires utilized. In this regard, the components in the upstream link partner 701a and/or the downstream link partner 701b may be adapted to handle an unevenly distributed lower communication rate.

Figure 8:
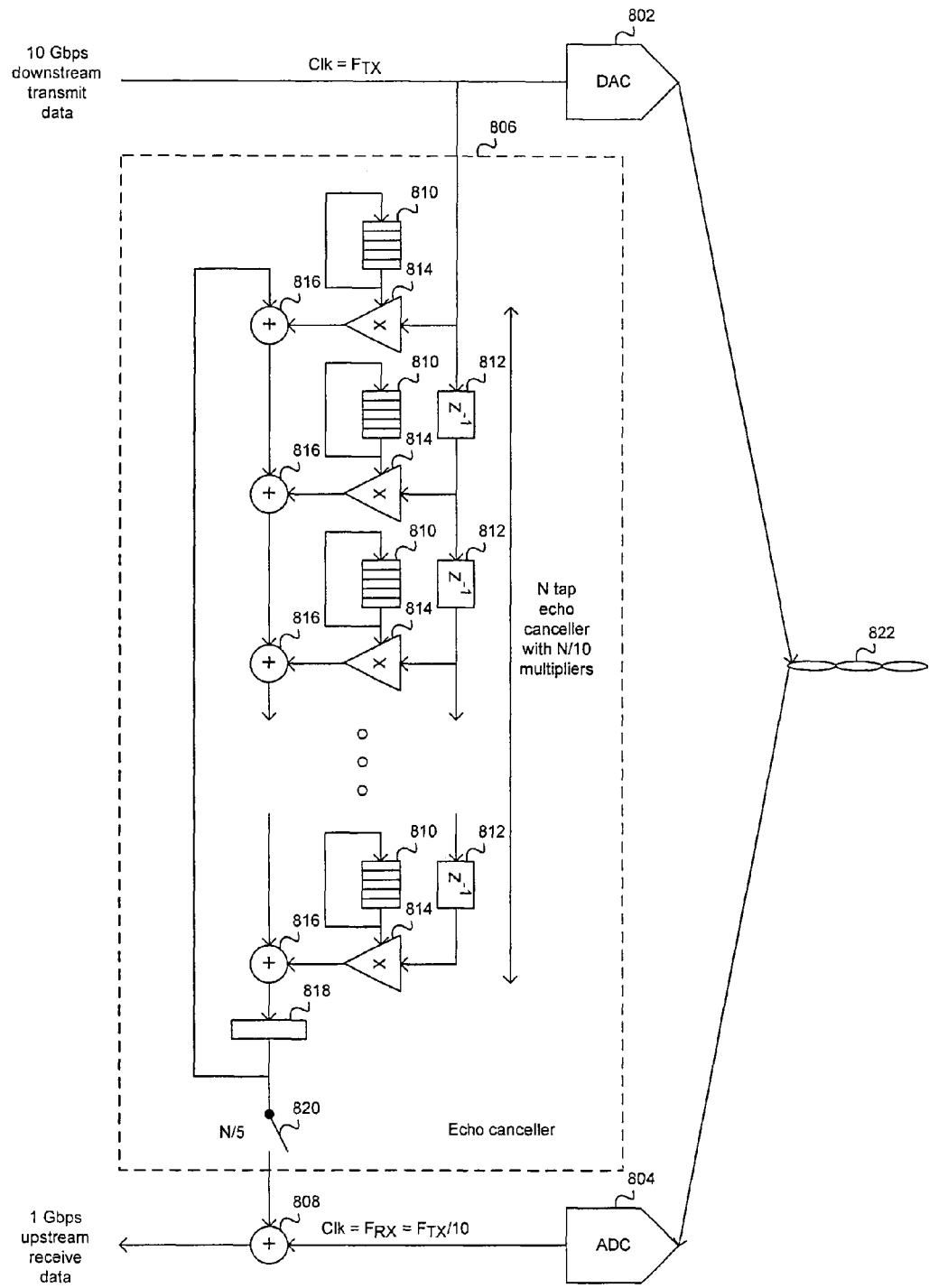
FIG. 8 is a block diagram of an exemplary echo canceller in an upstream asymmetric multi-rate PHY with a 10 Gbps downstream data rate and a 1 Mbps upstream data rate, in connection with an embodiment of the invention.

FIG. 8 is a block diagram of an exemplary echo canceller in an upstream asymmetric multi-rate PHY with a higher downstream data rate and a lower upstream data rate, in connection with an embodiment of the invention. Referring to FIG. 8, there is shown an echo canceller 806 in a portion of an asymmetric multi-rate transceiver in an upstream link partner that is utilized in a mode of operation that supports 10 Gbps downstream data rate and 1 Mbps upstream data rate. The echo canceller 806 may be implemented utilizing an N tap echo canceller architecture that utilizes N/10 multipliers, for example. In this regard, the echo canceller 806 may utilize a plurality of registers 810, a plurality of multipliers 814, a plurality of delay taps 812, a plurality of adders 816, an output register 818, and a switch 820.

The echo canceller 806 may utilize a digital downstream signal that is based on a transmission clock, $F_{TX}$, to generate an output signal via the switch 820 to be communicated to an adder 808, where the output signal is based on a receive clock, $F_{RX}=F_{TX}/10$. The digital downstream signal may be converted to an analog downstream signal by the digital-to-analog converter (DAC) 802 for transmission via a twisted-pair copper wire 822. An analog upstream signal may be received by an analog-to-digital converter (ADC) 804 for conversion to a digital upstream signal in the upstream link partner. The digital upstream signal and the output signal generated by the echo canceller 806 may be added in the adder 808 to reduce the ECHO component in the received digital upstream signal.

Figure 9:
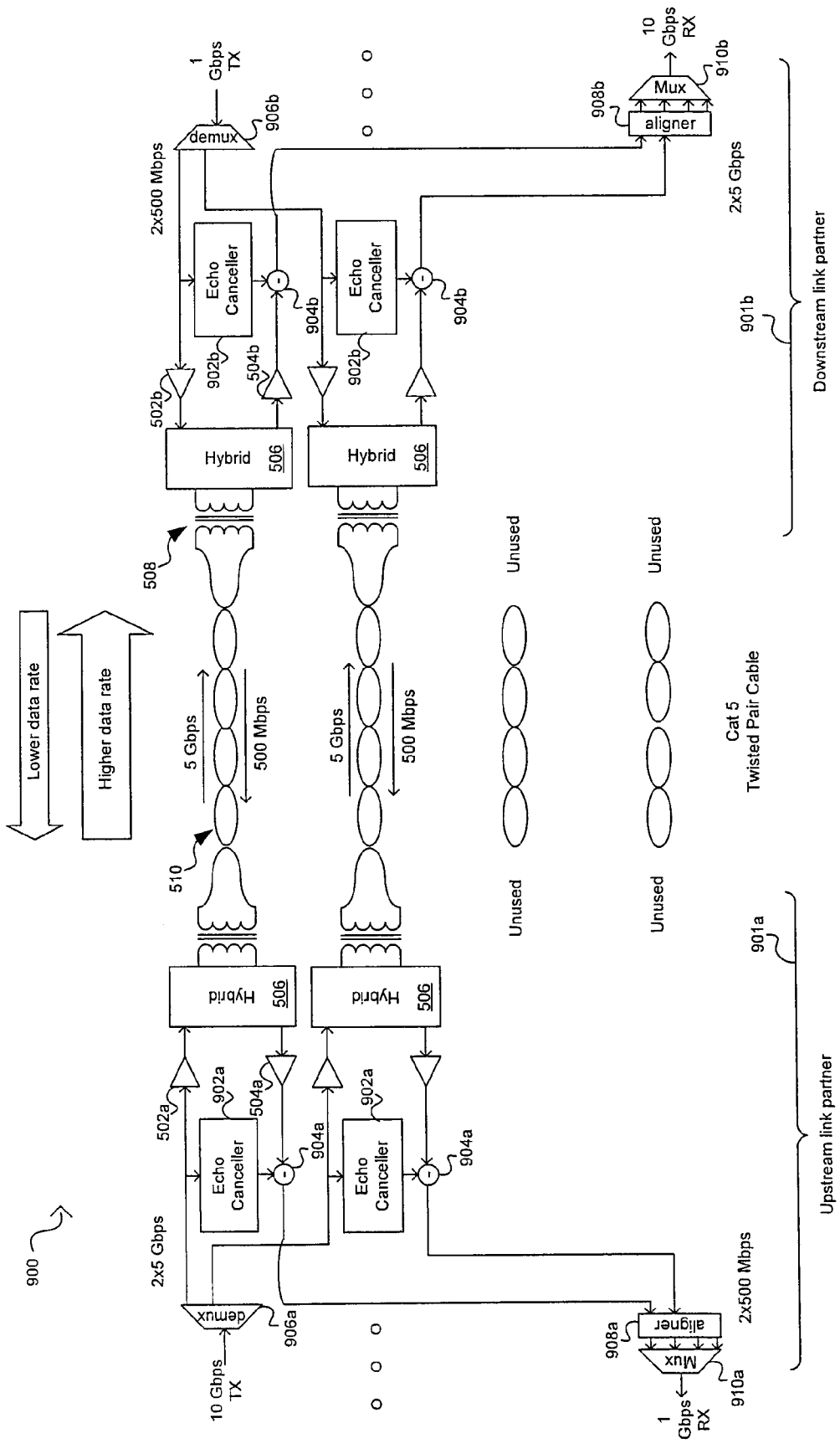
FIG. 9 is a block diagram of a multi-rate Ethernet system for asymmetric data traffic that utilizes 10 Gigabit signal processing resources in an asymmetric mode over fewer than 4 twisted pairs of wires, in accordance with an embodiment of the invention.

FIG. 9 is a block diagram of a multi-rate Ethernet system for asymmetric data traffic that utilizes Gigabit signal processing resources in a two-pair extended range mode, in accordance with an embodiment of the invention. Referring to FIG. 9, there is shown an asymmetric multi-rate Ethernet system 900 that may comprise an upstream link partner 901a and a downstream link partner 901b. The asymmetric multi-rate Ethernet system 900 may support a communication rate, for example, 10 Gbps downstream and 1 Gbps upstream. The asymmetric multi-rate Ethernet system 900 may also support other modes of operation, such as a lower asymmetric transmission rate over two-pair twisted-pair wire. In this regard, the asymmetric multi-rate Ethernet system 900 may support a lower communication rate, such as 10 Mbps downstream data rate and 2 Mbps upstream data rate, while utilizing the signal processing operations available in the asymmetric multi-rate PHY layer for processing the higher communication rate, such as 1 Gbps or 10 Gbps when available.

The upstream link partner 901a and the downstream link partner 901b may communicate, for example, via two Category 5 twisted-pair wires 510 in full duplex operation. A 5 Gbps downstream data rate at each wire may provide an aggregate downstream data rate of 10 Gbps and a 500 Mbps upstream data rate at each wire may provide an aggregate upstream data rate of 1 Gbps. The upstream link partner 901a may utilize two hybrids 506 with corresponding echo canceller 902a and a subtractor 904a. The upstream link partner 901a may also utilize a demux 906a, an aligner 908a, and a mux 910a for transmission and reception of signals at the reduced asymmetric communication rate. Similarly, the downstream link partner 901b may utilize two hybrids 506 with corresponding echo canceller 902b and a subtractor 904b. The downstream link partner 901b may also utilize a demux 906b, an aligner 908b, and a mux 910b for transmission and reception of signals at the reduced asymmetric communication rate. The two remaining twisted-pair wires may remain unused in the asymmetric multi-rate Ethernet system 900.

The asymmetric multi-rate Ethernet system 900 need not be limited to achieving a lower asymmetric communication rate by evenly distributing the data rate over each of the two twisted-pair wires utilized. In another embodiment of the invention, the asymmetric multi-rate Ethernet system 800 may achieve a lower communication rate by distributing the upstream and downstream data rates unevenly over each of the two twisted-pair wires utilized. For example, the first twisted-pair wire may support a 4 Gbps downstream data rate while the second twisted-pair wire may support 6 Gbps downstream data rate, to achieve an aggregate of 10 Gbps. Similarly, the first twisted-pair wire may support a 800 Mbps upstream data rate while the second twisted-pair wire may support 200 Mbps upstream data rate, to achieve an aggregate of 1 Gbps In this regard, the components in the upstream link partner 901*a* and/or the downstream link partner 901*b* may be adapted to handle an unevenly distributed lower communication rate with asymmetric data traffic.

Figure 10:
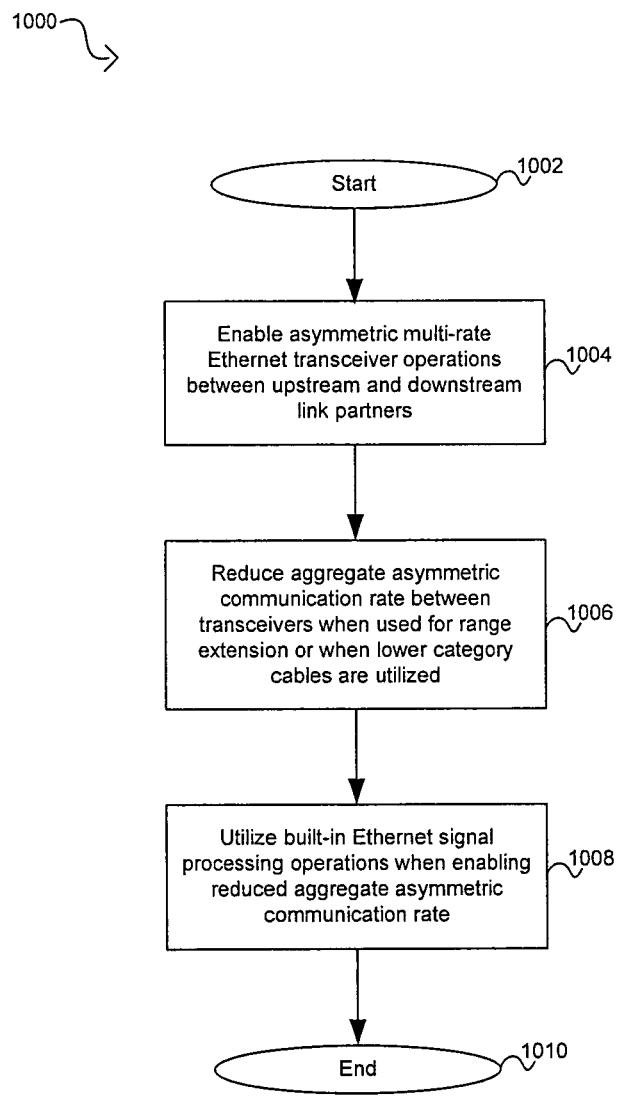
FIG. 10 is a flow diagram illustrating exemplary steps in communication rate reduction in Ethernet systems that utilize asymmetric multi-rate PHYs, in accordance with an embodiment of the invention.

FIG. 10 is a flow diagram illustrating exemplary steps in communication rate reduction to achieve extended range in Ethernet systems that utilize asymmetric multi-rate PHYs, in accordance with an embodiment of the invention. Referring to FIG. 10, there is shown a flow diagram 1000. After start step 1002, in step 1004, an asymmetric Gigabit Ethernet transceiver may be enabled. The Gigabit Ethernet transceiver may utilize an asymmetric multi-rate PHY layer that enables reducing the communication rate from, for example, 1 Gbps to a lower communication rate. The lower communication rate may be a 10 Mbps downstream data rate and a 2 Mbps upstream data rate, for example, but need not be so limited. The asymmetric multi-rate PHY layer may also enable reduction of the symbol rate for the asymmetric Gigabit Ethernet transceiver. When reducing the communication rate or symbol rate, the asymmetric multi-rate PHY layer enables the application of Gigabit signal processing operations to the reduced communication or symbol rate.

In step 1006, an extended range mode may be enabled in the asymmetric Gigabit Ethernet transceiver whereby the asymmetric multi-rate PHY layer reduces the communication rate and/or the symbol rate in at least one of the communication directions. In step 1008, at least a portion of the asymmetric Gigabit signal processing operations available in the asymmetric multi-rate PHY layer may be utilized during the extended range mode to enable the use of longer cables or to enable the use of higher insertion loss cables at the standard length. After step 1008, the process may proceed to end step 1010.

In an embodiment of the invention, signals may be communicated between a video signal source 110 and a video rendering device 112 via an asymmetrical multi-rate Ethernet physical layer (PHY). In this regard, the symbol rate may be reduced from a higher communication rate to a lower communication rate. The asymmetric multi-rate Ethernet PHY 412 may be enabled to support multiple rates. The asymmetrical multirate Ethernet PHY may be enabled to handle compressed and/or uncompressed, encrypted and/or unencrypted video signals as shown in FIG. 2B block 132 and FIG. 2C wherein, encryption and/or compression blocks are not shown. A communication rate of the signals communicated between the video signal source 110 and the video rendering device 112 may be reduced from a higher symbol rate to a lower symbol rate. One or more of the communicated signals may be modified by an echo cancellation operation, a near end cross talk (NEXT) cancellation operation, forward error correction (FEC) and/or a far end cross talk (FEXT) cancellation operation. The video signals communicated from the video signal source 110 to the video rendering device 112 may be equalized. An aggregate communication rate may be evenly or unevenly distributed among one or more links 114 coupling the video signal source to the video rendering device. A plurality of links 114 coupling the video signal source 110 to said video rendering device 112 may also be aggregated.

Another embodiment of the invention may provide a machine-readable storage, having stored thereon, a computer program having at least one code section executable by a machine, thereby causing the machine to perform the steps as described herein for enabling video communication via asymmetrical Ethernet physical layer devices.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A wired communication method for a video source device comprising an Ethernet MAC and an asymmetric multi-rate Ethernet PHY, the wired communication method comprising:

transmitting data from the asymmetric multi-rate Ethernet PHY over a twisted-pair wire of an Ethernet cable at a first downstream data rate;

receiving data at the asymmetric multi-rate Ethernet PHY over the twisted pair wire at a first upstream data rate, the first downstream data rate being larger than the first upstream data rate; and reducing the first downstream data rate to a second downstream data rate that is less than the first downstream data rate while performing a signal processing operation on the data transmitted at the first downstream data rate to at least one of extending a range of the Ethernet cable and increasing an insertion loss of the Ethernet cable.

2. The wired communication method of claim 1, further comprising:

reducing the first upstream data rate to a second upstream data rate that is less than the first upstream data rate while performing the signal processing operation on the data received at the first upstream data rate to at least one of extending the range of the Ethernet cable and increasing the insertion loss of the Ethernet cable.

3. The wired communication method of claim 1, wherein the reducing the first downstream data rate comprises utilizing multi-level signaling to reduce a symbol rate associated with the first downstream data rate.

4. The wired communication method of claim 2, wherein the reducing the first upstream data rate comprises utilizing multi-level signaling to reduce a symbol rate associated with the first upstream data rate.

5. The wired communication method of claim 1, wherein the signal processing operation comprises any one or more of an echo cancellation operation, a near end cross talk (NEXT) cancellation operation, a far end cross talk (FEXT) cancellation operation and a forward error correction (FEC) operation.

6. The wired communication method of claim 1, wherein the reducing the first downstream data rate to the second downstream data rate comprises dividing the first downstream data rate among the twisted-pair wire and a second twisted-pair wire of the Ethernet cable.

7. The wired communication method according to claim 2, wherein the reducing the first upstream data rate to the second upstream data rate comprises dividing the first upstream data rate among the twisted-pair wire and a second twisted-pair wire of the Ethernet cable.

8. A video signal source device comprising:
an Ethernet MAC; and
an asymmetric multi-rate Ethernet PHY configured to:
transmit data over a twisted-pair wire of an Ethernet cable at a first downstream data rate;
receive data over the twisted pair wire at a first upstream data rate, the first downstream data rate being larger than the first upstream data rate; and
reduce the first downstream data rate to a second downstream data rate that is less than the first downstream data rate while performing a signal processing operation on the data transmitted at the first downstream data rate to at least one of extending a range of the Ethernet cable and increasing an insertion loss of the Ethernet cable.

9. The video signal source device of claim 8, wherein the asymmetric multi-rate Ethernet PHY is further configured to reduce the first upstream data rate to a second upstream data rate that is less than the first upstream data rate while performing the signal processing operation on the data received at the first upstream data rate to at least one of extending the range of the Ethernet cable and increasing the insertion loss of the Ethernet cable.

10. The video signal source device of claim 8, wherein the asymmetric multi-rate Ethernet PHY reduces the first downstream data rate by utilizing multi-level signaling to reduce a symbol rate associated with the first downstream data rate.

11. The video signal source device of claim 9, wherein the asymmetric multi-rate Ethernet PHY reduces the first upstream data rate by utilizing multi-level signaling to reduce a symbol rate associated with the first upstream data rate.

12. The video signal source device of claim 8, wherein the signal processing operation comprises any one or more of an echo cancellation operation, a near end cross talk (NEXT) cancellation operation, a far end cross talk (FEXT) cancellation operation and a forward error correction (FEC) operation.

13. The video signal source device of claim 8, wherein the asymmetric multi-rate Ethernet PHY reduces the first downstream data rate to the second downstream data rate by dividing the first downstream data rate among the twisted-pair wire and a second twisted-pair wire of the Ethernet cable.

14. The video signal source device according to claim 9, wherein the asymmetric multi-rate Ethernet PHY reduces the first upstream data rate to the second upstream data rate by dividing the first upstream data rate among the twisted-pair wire and a second twisted-pair wire of the Ethernet cable.

15. A non-transitory machine-readable medium that stores machine readable instructions that, when executed by a machine for wired communication, cause the machine to:
transmit data from the asymmetric multi-rate Ethernet PHY over a twisted-pair wire of an Ethernet cable at a first downstream data rate;
receive data at the asymmetric multi-rate Ethernet PHY over the twisted pair wire at a first upstream data rate, the first downstream data rate being larger than the first upstream data rate; and
reduce the first downstream data rate to a second downstream data rate that is less than the first downstream data rate while performing a signal processing operation on the data transmitted at the first downstream data rate to at least one of extending a range of the Ethernet cable and increasing an insertion loss of the Ethernet cable.

16. The non-transitory machine-readable medium of claim 15, wherein when the machine readable instructions are executed by the machine for wired communication, the machine is further caused to reduce the first upstream data rate to a second upstream data rate that is less than the first upstream data rate while performing the signal processing operation on the data received at the first upstream data rate to at least one of extend the range of the Ethernet cable and increase the insertion loss of the Ethernet cable.

17. The non-transitory machine-readable medium of claim 15, wherein the reducing the first downstream data rate comprises utilizing multi-level signaling to reduce a symbol rate associated with the first downstream data rate.

18. The non-transitory machine-readable medium of claim 16, wherein the reducing the first upstream data rate comprises utilizing multi-level signaling to reduce a symbol rate associated with the first upstream data rate.

19. The non-transitory machine-readable medium of claim 15, wherein the signal processing operation comprises any one or more of an echo cancellation operation, a near end cross talk (NEXT) cancellation operation, a far end cross talk (FEXT) cancellation operation and a forward error correction (FEC) operation.

20. The non-transitory machine-readable medium of claim 15, wherein the reducing the first downstream data rate to the second downstream data rate comprises dividing the first downstream data rate among the twisted-pair wire and a second twisted-pair wire of the Ethernet cable.

* * * * *